US011275661B1

(12) United States Patent
Vantrease et al.

(10) Patent No.: US 11,275,661 B1
(45) Date of Patent: Mar. 15, 2022

(54) TEST GENERATION OF A DISTRIBUTED SYSTEM

(71) Applicant: Amazon Technologies, Inc., Seattle, WA (US)

(72) Inventors: Dana Michelle Vantrease, Austin, TX (US); Ron Diamant, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 168 days.

(21) Appl. No.: 16/582,346

(22) Filed: Sep. 25, 2019

(51) Int. Cl.
| G06F 3/06 | (2006.01) |
| G06F 11/26 | (2006.01) |
| G06F 11/22 | (2006.01) |
| G06N 3/08 | (2006.01) |
| G06F 11/34 | (2006.01) |
| G06F 11/263 | (2006.01) |

(52) U.S. Cl.
CPC .......... G06F 11/261 (2013.01); G06F 3/0659 (2013.01); G06F 11/2263 (2013.01); G06F 11/263 (2013.01); G06F 11/3404 (2013.01); G06N 3/08 (2013.01)

(58) Field of Classification Search
None
See application file for complete search history.

(56) References Cited

U.S. PATENT DOCUMENTS

| 7,844,973 | B1 * | 11/2010 | Dice ......................... G06F 9/52 718/108 |
| 8,266,412 | B2 * | 9/2012 | Glew .................... G06F 9/3857 712/220 |
| 8,341,636 | B2 * | 12/2012 | Wilhelm, Jr. ............. G06F 9/52 718/104 |
| 2006/0101081 | A1 * | 5/2006 | Lin ..................... G06F 16/2343 |
| 2010/0069035 | A1 * | 3/2010 | Johnson .............. H04L 41/0816 455/404.1 |
| 2016/0085772 | A1 * | 3/2016 | Vermeulen .............. G06F 16/21 707/615 |

\* cited by examiner

*Primary Examiner* — Michael Sun
(74) *Attorney, Agent, or Firm* — Kilpatrick Townsend & Stockton LLP

(57) ABSTRACT

A method of generating instructions to be executed by a plurality of execution engines that shares a resource is provided. The method comprises, in a first generation step: reading a first engine logical timestamp vector of a first execution engine of the execution engines, the logical timestamp representing a history of access operations for the resource; determining whether the first engine logical timestamp vector includes a most-up-to-date logical timestamp of the resource in the first generation step; based on the first engine logical timestamp vector including the most-up-to-date logical timestamp of the resource in the first generation step, generating an access instruction to be executed by the first execution engine to access the resource; and scheduling the first execution engine to execute the access instruction.

20 Claims, 16 Drawing Sheets

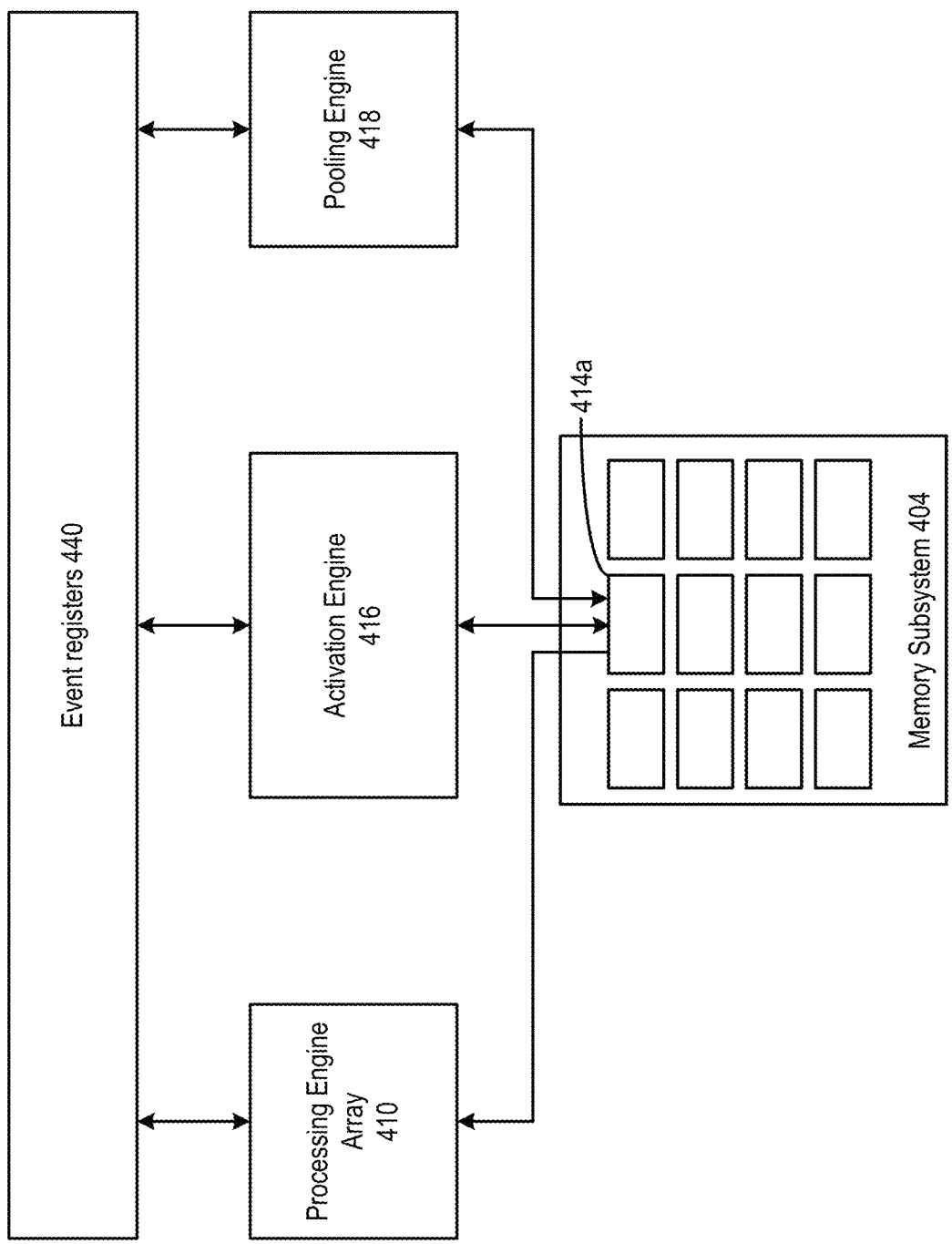

| Time | Engine A instructions | Engine B instructions |
|---|---|---|
| 0 | Write 0x0 | |
| 1 | SET X | |
| 2 | | WAIT AND CLEAR X |
| 3 | | Read 0x0 |

FIG. 4C

| Time | Engine A instructions | Engine B instructions |
|---|---|---|
| 0 | Write 0x0 | |
| 1 | SET X | ~~Write 0x0~~ |
| 2 | | WAIT AND CLEAR X |
| 3 | | Read 0x0 |

FIG. 4D

| Time | Engine A instructions | Engine B instructions |
|---|---|---|
| 0 | Write 0x0 | |
| 1 | SET X | |
| 2 | ~~SET X~~ | WAIT AND CLEAR X |
| 3 | | Read 0x0 |

| Generation step | Engine A instructions | Engine B instructions |
|---|---|---|
| 0 | SET X | |
| 1 | Write P | |
| 2 | | WAIT AND CLEAR X |
| 3 | Write P | |
| 4 | | Write Q |

530 →

| Time | Engine A instructions | Engine B instructions |
|---|---|---|
| 0 | SET X | |
| 1 | Write P | WAIT AND CLEAR X |
| 2 | Write P | Write Q |

FIG. 5B

| Generation step | Engine A instructions | Engine B instructions | Engine C instructions | Engine A timestamp vector ⌐602 | Engine B timestamp vector ⌐604 | Engine C timestamp vector ⌐606 | Event X timestamp vector ⌐612 | Event Y timestamp vector ⌐614 | Event X state ⌐622 | Event Y state ⌐624 |
|---|---|---|---|---|---|---|---|---|---|---|
| Init | | | | {0,0} | {0,0} | {0,0} | {0,0} | {0,0} | Clear | Clear |
| 0 | SET X | | | {0,0} | {1,0} | {0,0} | {0,0} | {0,0} | Set | Clear |
| 1 | | WAIT AND CLEAR X | | {0,0} | {1,0} | {0,0} | {0,0} | {1,0} | Clear | Clear |
| 2 | | SET Y | | {0,0} | {1,0} | {1,1} | {0,0} | {1,0} | Clear | Set |
| 3 | | | WAIT AND CLEAR Y | {0,0} | {1,0} | {1,1} | {0,0} | {1,0} | Clear | Clear |
| 4 | ~~SET X~~ | | | {0,0} | {1,0} | {1,1} | {1,1} | {1,0} | Clear | Clear |
| 5 | | | SET X | {0,0} | {1,0} | {1,1} | {1,1} | {1,0} | Set | Clear |

| Generation step | Engine A instructions | Engine B instructions | Engine A timestamp vector (632) | Engine B timestamp vector (634) | Event X timestamp vector (642) | Event Y timestamp vector (644) | Event X state (622) | Event Y state (624) |
|---|---|---|---|---|---|---|---|---|
| Init | | | {0,0,0.00} | {0,0,0.00} | {0,0,0.00} | {0,0,0.00} | Clear | Clear |
| 0 | Write P | | {0,0,1.00} | {0,0,0.00} | {0,0,0.00} | {0,0,0.00} | Clear | Clear |
| 1 | SET X | | {0,0,1.00} | {0,0,0.00} | {0,0,1.00} | {0,0,0.00} | Set | Clear |
| 2 | Read P | | {0,0,1.10} | {0,0,0.00} | {0,0,1.00} | {0,0,0.00} | Set | Clear |
| 3 | SET Y | | {0,0,1.10} | {0,0,0.00} | {0,0,1.00} | {0,0,1.10} | Set | Set |
| 4 | | Read P | {0,0,1.10} | {0,0,0.00} | {0,0,1.00} | {0,0,1.10} | Set | Set |
| 5 | | WAIT AND CLEAR X | {0,0,1.10} | {1,0,1.00} | {0,0,1.00} | {0,1,1.10} | Clear | Set |
| 6 | | Read P | {0,0,1.10} | {1,0,1.01} | {0,0,1.00} | {0,1,1.10} | Clear | Set |
| 7 | | Write P | {0,0,1.10} | {1,0,1.01} | {0,0,1.00} | {0,1,1.10} | Clear | Set |
| 8 | | WAIT AND CLEAR Y | {0,0,1.10} | {1,1,1.11} | {0,0,1.00} | {0,1,1.10} | Clear | Clear |
| 9 | | Write P | {0,0,1.10} | {1,0,2.00} | {0,0,1.00} | {0,1,1.10} | Clear | Clear |

FIG. 6B

TEST GENERATION OF A DISTRIBUTED SYSTEM

BACKGROUND

A test generation software is useful for generating a large volume of tests to test a system. In contrast to tests that are crafted by human programmers to mimic real-life operations, which tend to use only a small fraction of the system capabilities, tests generated by an automatic test generation software can exercise a larger (or even fuller) space of capabilities supported by the system. In a case where the system under test is a hardware system, the test programs can be supplied to a simulation program to simulate the behavior of the hardware system (e.g., in the form of a simulation model, such as a register-transfer level (RTL) model) in executing the programs, or can be executed by the actual hardware system, to obtain test results. The test results can be compared with reference results to verify the design of the hardware system and to debug the design if there is discrepancy.

A test generation software can also be used to generate a large number of distributed test programs to test a distributed system comprising a plurality of execution engines. A distributed test program may include parallel instructions that can be executed by the execution engines in parallel. The distributed system may have shared access to a resource, such as a memory resource, and the testing of the functionalities of the distributed system can be based on examining the state of the memory resource. The distributed test program needs to be generated to ensure that the parallel instructions are properly synchronized among each execution engine, such that the state of the shared resource remains deterministic during the execution of the distributed program and can be used to verify/debug the design of the hardware components of the distributed system.

BRIEF DESCRIPTION OF THE DRAWINGS

Various embodiments in accordance with the present disclosure will be described with reference to the drawings, in which:

FIGS. 4A-4E illustrate an example neural network processor and its operations, according to certain aspects of the present disclosure;

FIGS. 5A-5C illustrate an example test generator that can generate randomized instructions for a distributed system including the example neural network processor of FIGS. 4A-4E;

FIGS. 6A-6B illustrate example sequences of generating randomized instructions by the example test generator of FIGS. 5A-5C;

DETAILED DESCRIPTION

Figure 1:
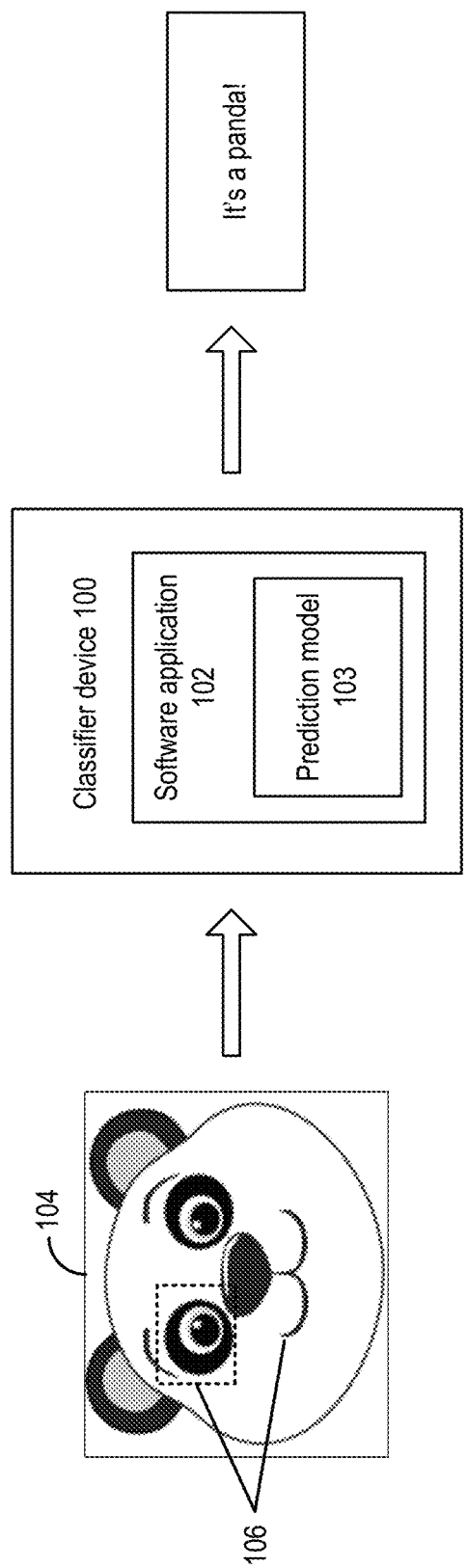
FIG. 1 illustrates an example of a classifier device that uses techniques disclosed herein to process data.

Examples of the present disclosure relate to hardware testing, and more specifically, to generating randomized and synchronized instructions for testing a distributed system.

A test generation software can be used to generate a large number of distributed test programs to test the various capabilities of a distributed system, such as a neural network processor, which can include a plurality of execution engines each corresponding to a different processing stage of a neural network. For example, a neural network hardware accelerator may include a systolic array to perform arithmetic operations to generate intermediate outputs of a neural network layer, a pooling engine to optionally reduce the dimension of the intermediate outputs, and an activation engine to optionally apply an activation function on the reduced intermediate outputs to generate outputs of the neural network layer. Each of the systolic array, the pooling engine, and the activation engine can share a memory to perform the operations. Specifically, the systolic array can fetch weight and input data from the memory. Depending on the programming, the pooling engine can obtain intermediate output data from the systolic array or from the memory, perform the pooling operation, and store the reduced intermediate data back to the memory. Similarly, the activation engine can also apply activation function processing on the intermediate data from the systolic array or from the memory depending on programming, and store the processed data back to the memory. The systolic array, the activation engine, and the pooling engine can be programmed to execute in parallel to process different data at different times to expedite the neural network computations.

A distributed program may include parallel codes that can be executed by the execution engines in parallel. The program can be generated based on a random function and/or based on a pre-determined test pattern. An instruction, as well as its parameters, can be selected from a space of supported instructions and parameters based on the random function and/or the test pattern. Moreover, the assignment of a particular execution engine to execute a particular instruction can also be based on the random function and/or test pattern.

A test generation software can be configured to generate a large number of distributed test programs, which can be useful for testing a hardware system. Specifically, the distributed test programs can cover various functionalities of the hardware system under test. Compared with tests that align with real-life workloads, which tend to use only a small fraction of the hardware capabilities, such distributed test programs can perform more thorough testing of the capabilities of the hardware system. Moreover, the test generation software can automatically generate a large number of distributed test programs in a short time. All these can improve the efficiency of the test generation process, as well as the coverage of the tests, which in turn can improve the verification and debugging of the hardware. In the example of testing a neural network processor, the distributed test program of instructions can be used to, for example, test the capabilities of the systolic array, activation engine, and the pooling engine in supporting potential future neural network models, stress-test the various hardware components included in these execution engines, etc.

Although a test generation software can generate test programs that provide a broader test scope, there are challenges in generating distributed test programs for testing a distributed system having a plurality of execution engines. Specifically, the execution engines may execute some of the instructions in parallel. But instructions that seek to modify a shared resource cannot be executed in parallel. Moreover, these instructions also need to be synchronized properly to follow a deterministic order, so that the state of the shared resource, and the state of execution of these instructions, remain deterministic during the execution of the distributed program. Having the state of the shared resource and state of execution of the instructions to be deterministic can be critical in order to verify/debug the functionality of the hardware components of the distributed system. On the other hand, if the instructions are not synchronized, the state of the shared resource and the execution of the instructions may change based on the relative timing of execution of instructions in the execution engines. As the execution engines typically execute instructions in parallel, the relative timing of execution of instructions in those execution engines is not well-defined, and the state of the shared resource and the execution of the instructions may become non-deterministic and cannot serve as references to verify/debug the functionality of the distributed system.

As an illustrative example, the distributed test program may include a write instruction for a first execution engine to write first data to a first address of the memory, and a read instruction for a second execution engine to read the first address. If those instructions are not synchronized, such that the relative timing of execution of those instructions are not well-defined, the state of the first address as well as the result of the read instruction may become non-deterministic. For example, if the write instruction is executed first, followed by the read instruction, the second execution engine can obtain the first data by executing the read instruction. But the read result becomes different if the read instruction is executed prior to the write instruction. As the state of the first address and the result of the read instruction become non-deterministic, they cannot be used to verify/debug the functionality of the distributed system.

One way to synchronize two execution engines is based on an event, which is also generally known as a "conditional variable" and a "message" and can be passed from one execution engine to another. An execution engine can take on a producer role to execute a SET instruction to set an event (e.g., to a first value such as a logical one), while another execution engine can take on a consumer role to execute a WAIT instruction to wait for the event to be set, or a WAIT-AND-CLEAR instruction to wait for the event to be set, and then clear the event (e.g., by setting the event to a second value such as a logical zero). The passing of the event from one execution engine to another execution engine can be based on writing an event register that is accessible by both execution engines. The pair of SET and WAIT (or WAIT-AND-CLEAR) instructions can be used to define the timing relationship between the memory access operations by the producer and consumer execution engines. For example, if the producer execution engine executes a write instruction to write first data to the first address followed by the SET instruction, whereas the consumer execution engine executes the WAIT (or WAIT-AND-CLEAR) instruction followed by a read instruction to read the first address, it can be guaranteed that the second execution engine sees that update to the first address by the producer execution engine and reads the first data.

Although two execution engines can be synchronized by the SET and WAIT (or WAIT-AND-CLEAR) instructions, those instructions also need to be synchronized among the execution engines to ensure that the state of the event is also deterministic. But if multiple execution engines are allowed to set the same event (at the shared event register) without the event being cleared, or if the execution engine that sets an event is not the one that clears the event, the state of the event may become dependent on which of the execution engines sets the event first. As the execution of the set instructions can be parallel in a distributed system absent explicit synchronization between these instructions, the state of the event can become non-deterministic. Therefore, in a case where a test generator generates the memory access instructions (write/read, etc.) and the event register access instructions (SET, WAIT, and WAIT-AND-CLEAR) and assigns those instructions to the execution engines based on a random function, the test generator needs to ensure all these instructions are synchronized to ensure that the state of the memory, as well as the state of the execution engines (e.g., what the execution engines read from the memory), are deterministic.

Examples of the present disclosure relate to system testing, and more specifically, to generating synchronized instructions for testing a distributed system, such as a neural network processor. According to some examples, a test generator can generate test instructions for different execution engines of a distributed system in a sequence of generation steps. The test instruction may include an instruction to access a shared resource, such as a SET instruction and a WAIT-AND-CLEAR instruction to, respectively, set and clear the state of an event, which can also serve to synchronize the write/read instructions among the execution engines. The candidate instruction can also include a write instruction and a read instruction to a memory. In each generation step, the test generator can generate an instruction and assign the instruction to a target execution engine based on determining that the execution of the instruction at the target execution engine does not lead to a non-deterministic state in the shared resource (e.g., the event, the memory) and/or in the distributed system (e.g., the data read from the memory being non-deterministic) due to the candidate instruction being not synchronized with other test instructions assigned to other execution engines.

To determine whether a test instruction can lead to a non-deterministic state, the test generator can employ a logical timestamp system. The test generator can determine a logical timestamp vector including a logical timestamp for each shared resource to track a history of accesses of the shared resource in each generation step. The access history may include, for example, a history of read operations and write operations to a particular address/region of the memory, a history of clear operations to clear an event, etc. A logical timestamp can include a value indicative of when an access operation was last executed. In some examples, a logical timestamp for a resource can be initialized at zero, and can be incremented whenever the resource is accessed. A logical timestamp vector can include a logical timestamp for different access instructions, such as clearing an event, a write operation to an address/region of a memory, a read operation to the address/region of the memory, etc. In a case where the distributed system supports multiple events and accesses to multiple addresses/regions of the memory, the timestamp vector can include a timestamp for each event and for each address/region of the memory. In a case where a timestamp is assigned to a region of the memory, the timestamp can be updated for each instruction that accesses an address within the region. The size and location of a memory region assigned with a timestamp can be either static, or dynamically updated by a test generator when generating the instructions. The logical timestamp for the memory regions can be updated when the sizes/locations of the memory regions are updated.

The test generator can maintain a local version of the logical timestamp vector of the shared resources for each execution engine (hereinafter, "engine logical timestamp vector") and for each event (hereinafter, "event logical timestamp vector"), and can update the engine logical timestamp vector and event logical timestamp vector in each generation step based on the candidate instruction. The engine logical timestamp vector can represent a history of accesses of the shared resource by a particular execution engine, or a history of accesses of the shared resource that is visible to the execution engine. The event logical timestamp vector is used to transfer an access history of a resource, as represented by an engine logical timestamp vector, from one execution engine to another execution engine. The test generator also maintains a state of the event (e.g., being set or cleared). As to be discussed in more detail below, to ensure that the execution of an instruction that accesses a shared resource at an execution engine does not lead to a non-deterministic state, the test generator can provide the instruction to the execution engine only if the execution engine has the engine logical timestamp vector that reflects the most up-to-date access history of the shared resource, and only if the shared resource is available for the access.

Specifically, under the logical timestamp scheme, when a first execution engine executes a SET instruction to set a first event and becomes a producer of the first event, the engine logical timestamp vector of the first execution engine, which represents a history of accesses of a shared resource by the first execution engine or the history that is visible to the engine, can be copied to the event logical timestamp vector of the first event. A second execution engine can execute a WAIT-AND-CLEAR instruction to clear the first event and become a consumer of the second event. As a consumer, the second execution engine can combine its engine logical timestamp vector with the event logical timestamp vector of the second event to generate a new engine logical timestamp vector, which represents a combined history of accesses of the shared resource that is visible to the second execution engine up to that time point. The second execution engine can also update the logical timestamp of the first event in the new engine logical timestamp vector to record its clearing of the first event. If the second execution engine also accesses other shared resources (e.g., the memory) after the WAIT-AND-CLEAR instruction, the second execution engine can also update the logical timestamp of that shared resource in the new engine logical timestamp vector. The new engine logical timestamp vector can be passed over to another execution engine when the second execution engine executes a SET instruction to set the first event or another event. The test generator can increment the logical timestamp of a shared resource upon in a generation step upon approving the candidate instruction that accesses the shared resource, with a larger logical timestamp representing a more recent access of the resource. The combining of the engine logical timestamp vector and the event logical timestamp vector can be based on finding a maximum of the logical timestamps of the shared resource between the two logical timestamp vectors in that generation step.

To prevent providing an instruction to an execution engine that can lead to a non-deterministic state, the test generator can enforce a number of rules concerning the SET instruction (for an event) and the write instruction (for an address of a memory) to determine whether to provide the SET instruction and the write instruction to an execution engine. The determination can be based on whether the timestamp of the shared source (event, memory, etc.) in the engine logical timestamp vector of the execution engine is the most up-to-date.

Specifically, the test generator may generate a SET instruction in a generation step to set a first event and assign the SET instruction to a first execution engine to be executed at a first time, at which point the test generator can first determine a state of the first event in the generation step. If the first event is in the set state, the test generator can discard the SET instruction and regenerate another instruction for the first execution engine (or for other execution engines). Next, the test generator can determine whether the first execution engine, at that generation step, has the most recent logical timestamp of the first event in its engine logical timestamp vector. The test generator can determine the most recent logical timestamp of the first event by finding a maximum of the logical timestamp of the first event among the engine logical timestamp vectors of all of the execution engines in the generation step, and comparing it with the logical timestamp of the first event in the engine logical timestamp vector of the first execution engine in the same generation step. If the two logical timestamps do not match, the test generator can discard the SET instruction and regenerate another instruction for the first execution engine.

The arrangements above can ensure only the execution engines having the most up-to-date logical timestamp of an event to set the event. This allows a deterministic order of updating of the event and prevents double setting of the event, all of which can ensure that the state of the event is deterministic. Moreover, as the event also has the function of conveying the logical timestamp vector of other shared resources to the consumer execution engine, such arrangements also ensure that the consumer execution engine has the most updated history of accesses of the other shared resources.

In addition, when the test generator generates a write instruction to an address/region of a memory and assigns the write instruction to the first execution engine in a generation step, the test generator can determine whether the first execution engine has the most recent logical timestamps of write and read operations for that address/region of the memory in its engine logical timestamp vector in the generation step. The test generator can determine the most recent logical timestamps of the write operation and the read operation by finding a maximum of the respective logical timestamps among the engine logical timestamp vectors of all of the execution engines, and comparing the maximum logical timestamps with the respective timestamps of the write operation and the read operation in the engine logical timestamp vector of the first execution engine. If the logical timestamps do not match, the test generator can discard the write instruction and regenerate another instruction for the first execution engine.

The arrangements above can ensure that only the execution engine having the most updated history of write operations and read operations can perform a write operation to the memory. This can ensure that the write operation by that execution engine is serialized with other write operations by other execution engines, and the order of write operations, as well as the state of data stored in the memory, can become deterministic. Moreover, the write operation is performed deterministically only after the latest read operation (relative to the second time when the write instruction is executed) completes, which can ensure that the data read from the memory by other execution engines are deterministic.

Moreover, when the test generator generates a read instruction to an address/region of a memory and assigns the write instruction to the first execution engine in a generation step, the test generator can determine whether the first execution engine has the most recent logical timestamps of write operations for that address/region of the memory in its engine logical timestamp vector in the generation step. Such arrangements can ensure that the read operation is deterministically performed after the most recent write operation, which can ensure that the data read by the read operations are deterministic. However, the read operation needs not be synchronized with other read operations by other execution engines as long as those read operations are performed after the most recent write operation, which allows parallel read operations by the execution engines.

There are various ways by which the test generator can generate a test instruction. In some examples, the test generator can employ a random function to select a candidate instruction from a database of instructions, and to determine a parameter for the candidate instruction and which target execution engine to assign the candidate instruction to. If the candidate instruction is an instruction that accesses a shared resource (e.g., a SET event instruction, a read instruction to read from a memory address, a write instruction to read from a memory address, etc.), the test generator can check the logical timestamps for the shared resource (event, memory address, etc.) of the target execution engine based on the aforementioned rules to determine whether the execution of the candidate instruction can lead to a non-deterministic state in the shared resource (e.g., the event, the memory) and/or in the distributed system (e.g., the data read from the memory being non-deterministic), as explained above. If the execution of the candidate instruction does not lead to a non-deterministic state, the test generator can provide the candidate instruction to the target execution engine by, for example, storing the candidate instruction in a program file to be executed by the target execution engine, providing the candidate instruction to a simulator that simulates the behavior of the target execution engine, etc. On the other hand, if the execution of the candidate instruction leads to a non-deterministic state, the test generator can discard the candidate instruction. The test generator can then regenerate the candidate instruction and assign the instruction to the target execution engine or other execution engines based on the random function.

In some examples, the test generator can also employ a constraint solver to generate the test instructions according to a pre-determined test pattern. The constraint solver may set constraints on the generation of the test instruction based on the aforementioned rules. For example, instead of generating test instructions that are completely independent from each other, the test generator can employ a Markov chain model to generate a test instruction that not only satisfies a pre-determined relationship with prior-generated (and approved) instructions but also satisfies the aforementioned rules. As an illustrative example, the test generator may determine, based on a prior instruction of a target execution engine being a SET instruction, to assign a WAIT-AND-CLEAR instruction as a new test instruction to the target execution engine. The test generator may also select, based on a test pattern (e.g., to traverse all available events), an event to be set by the SET instruction. The selection of which event to be set by the SET instruction can be constrained, by the constraint solver, based on the aforementioned rules. For example, the constraint solver can ensure that the selected event is either an event that has not been cleared by a prior WAIT-AND-CLEAR instruction, or if the event has been cleared by a prior WAIT-AND-CLEAR instruction, that the target execution engine must have the most up-to-date logical timestamp of that event. The test instruction can then be stored in a program file or provided to a simulator, as described above.

Examples of the present disclosure allow automatic test generation for a distributed system, which can expand the scope of testing of the distributed system while ensuring that the execution of the instructions do not put the shared resource, nor the distributed system, in a non-deterministic state. All these can improve the efficiency of the test generation process, as well as the validity and coverage of the tests, which in turn can improve the verification and debugging of the hardware.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example classifier device 100 that uses techniques disclosed herein to process data. Classifier device 100 can be, for example, a computing device operating a software application 102 and a prediction model 103 to predict information included in a data sequence, and perform a predetermined function based on the prediction. For example, classifier device 100 can be part of an image recognition service provided to identify certain objects (e.g., text, a person, etc.) from an image. It is understood that the image recognition service is merely provided as an illustrative example, and that techniques disclosed herein can be used for other data processing applications including, for example, text-based data processing (e.g., processing of search queries), audio data processing, etc. Moreover, classifier device 100 may operate a number of different prediction models to process different input data, either in parallel or at different times.

In some examples, the image recognition service can be provided in a multi-tenant compute service system. The multi-tenant compute service system may typically include a plurality of servers that can host data and be used by multiple clients or organizations to run instances, such as virtual machine instances or bare-metal instances (e.g., operating systems that run directly on the server hardware). In most instances, such as bare-metal or virtual machine instances, a multi-tenant compute service system may be allocated to a client when the client needs them and decommissioned when they are no longer needed, such that the resources can be reallocated to other clients. In the present disclosure, the terms "tenant," "client," and "customer" may be used interchangeably, although such terms do not necessarily imply the existence of any particular business arrangement. The term "instance" may refer to, for example, an instance that is executed directly on server hardware or as a virtual machine. Different types of instances generally correspond to different hardware functions and/or arrangements of hardware (e.g., different amounts of available memory and/or processing hardware). In the example of FIG. 1, the multi-tenant compute service system may provide the image recognition service when the client needs it, and the service is decommissioned when it is no longer needed, such that the resources supporting the image recognition service (e.g., access to software application 102, and the underlying hardware resources for processing software application 102) can be reallocated to other clients. Different clients (or one client) may request application 102 to perform processing of different input data using the same or different prediction models including prediction model 103.

In the example of FIG. 1, software application 102 can receive pixel data of an image 104 from a user. Image 104 may include an array of pixels. Software application 102 can perform analysis on the pixel data, and predict one or more objects 106 depicted in image 104. The analysis may include, for example, comparing the pixel data against a set of predetermined features data. The predetermined features data may include data associated with a set of predetermined visual image features such as, for example, a nose object, a mouth object, etc. The predetermined features data may also include data associated with non-visual image features, or a combination of visual and non-visual image features. As to be discussed in more detail below, software application 102 may employ prediction model 103 to compute a set of scores based on the pixel data of image 104. The set of scores may represent, for example, the likelihood of image 104 including the image features represented by the features data. Software application 102 can then determine other information about the content of image 104 based on the scores. For example, based on the scores, software application 102 can determine that image 104 is an image of, for example, a panda, a cat, or other objects.

Prediction model 103 can be in the form of an artificial neural network. The artificial neural network may include a plurality of processing nodes, with each processing node configured to process part of the input pixel data, or to further process the intermediate outputs from other processing nodes. FIG. 1 illustrates an example of prediction model 103 that uses techniques disclosed herein. In FIG. 1, prediction model 103 may be a multi-layer neural network such as a deep neural network (DNN), a convolutional neural network (CNN), etc. Prediction model 103 may include an input layer 207, a set of intermediate layers including intermediate layers 209 and 211, and an output layer (not shown in FIG. 2A). It is understood that prediction model 103 can also include other different types of neural networks including, for example, long short-term memory (LSTM), multilayer perception (MTP), multiscale densenet (MSD-NET), etc.

Layer 207 may process pixel data representing different portions of image 104. For example, in the example of FIG. 2A, layer 207 may process the pixel data of image 204. Each processing node of layer 207 is assigned to receive a pixel value (e.g., $x_0$, $x_1$, $x_2$, ... $x_n$) corresponding to a predetermined pixel within image 104, and transmit one or more weights with the received pixel value to layer 209. In a case where prediction model 203 is a DNN, each processing node of layer 207 can be assigned a set of weights defined based on a matrix W1. Each processing node of layer 207 can send the received pixel value and the assigned weights to each processing node of layer 209. In a case where prediction model 103 is a CNN, groups of the processing nodes of layer 207 may share a set of weights, and each group may send the set of weights and the pixel values received by the group of processing nodes to a single processing node of layer 209. Different neural network models may include different topologies (e.g., including a different number of layers, different connections between layers, etc.), and/or include a different set of weights for each layer.

Layer 209 may process the scaled outputs from layer 207 to generate a set of intermediate outputs. For example, assuming processing node 210a of layer 209 is connected to n processing nodes in layer 207, processing node 210a may generate a sum of the scaled outputs received from layer 207 based on the following equation:

$$\text{sum}_{210a} = \sum_{i=0}^{n} (W1_i \times x_i) \quad \text{(Equation 1)}$$

Here, $\text{sum}_{210a}$ represents an intermediate output generated by processing node 210a. $W1_i \times x_i$ represents a scaling of a particular pixel value (e.g., $x_0$) with the associated weight (e.g., $W1_0$) by a processing node of layer 207. In a case where prediction model 103 is a DNN, each processing node of layer 209 may generate the sum based on the scaling of pixel values from each processing node of layer 207, and then generate a sum (e.g., $\text{Sum}_{210a}$) by summing the scaled pixel values. The sum may also represent a dot-product between an input vector comprising a number of elements (e.g., pixel values) and a weight vector (e.g., W1). In some examples, a bias can also be added the scaled outputs to generate the intermediate output.

In a case where prediction model 103 is a CNN, each processing node of layer 209 may generate the intermediate output based on the scaling of pixel values from a group of processing nodes of layers 207. The intermediate output may represent a convolution result between a group of pixel values and a filter comprising the weight values. FIG. 2B illustrates an example of a convolution operation that layer 209 may perform. In FIG. 2B, filter 230 may include a two-dimensional array of weights. The weights in filter 230 may represent a spatial distribution of pixels for certain features to be detected from the image. The two-dimensional array may have a height of R rows and a width of S columns, and is typically smaller than an input image with a height of H pixels and a width of W pixels. Each weight may be mapped to a pixel in a rectangular block of pixel values with the same R rows and S columns. A processing node of layer 209 (e.g., processing node 210a) can receive, from a group of processing nodes of input layer 207, a group 240 of pixel values corresponding to a first rectangular block of pixels from the input image, which corresponds to a first stride location of filter 230, and generate a convolution output 242 based on a summation of multiplication results between each weight of filter 230 and each corresponding pixel in group 240 according to Equation 1, to generate a dot-product between a matrix represented by filter 230 and a matrix represented by group 240. Another processing node of layer 209 can also receive, from another group of processing nodes of input layer 207, a group 244 of pixel values corresponding to a second rectangular block of pixels from the input image corresponding to a second stride location of filter 230, and generate a convolution output 246 based on a summation of multiplication results between each weight of filter 230 and each corresponding pixel in group 244 according to Equation 1, to generate a dot-product between the matrix of filter 230 and a matrix represented by group 240. In some examples, each convolution output in FIG. 2B (e.g., convolution output 242, convolution output 346, etc.) can correspond to the output of a processing node of layer 209. In some examples, the pixel data in the input image may be referred to as an input feature map to indicate that the pixels are processed by the same filter (or same sets of filters) corresponding to certain feature(s). The convolution outputs may be referred to as an output feature map to indicate that the output is the result of processing an input feature map with the filter.

As shown in FIG. 2B, the convolution operations can be arranged in a sliding-window such that the second rectangular block overlaps, or is otherwise adjacent to, the first rectangular block in the input image. For example, in the example of FIG. 2B, D may be a distance of stride (in pixel) of the sliding-window for each convolution operation, such that the block of pixels corresponding to group 244 may be situated at a distance D (in terms of pixels) from the block of pixels corresponding to group 240, and the next block of pixels may also be situated at the same distance D from group 244. Other processing nodes of layer 209 may also receive groups of pixels corresponding to other rectangular blocks and generate other intermediate outputs. The convolution outputs can be part of a convolution output array. The array of convolution outputs can have a smaller height and a smaller width than the input image. Rectangular blocks of the convolution outputs can be further grouped, and convolution operations can be performed at layer 211 between the groups of convolution outputs and another set of filter weights to generate another set of convolution outputs.

Referring back to FIG. 2A, one processing node of layer 209 may be configured to generate the convolution output elements of one convolution output array, and a set M of processing nodes of layer 209 can correspond to a set M of convolution output arrays. The processing node of layer 209 can also process each convolution output with an activation function to generate an activation output. The activation function may translate the convolution output into a decision of whether to forward the convolution output to intermediate layer 211 to influence the classifier decision (analogous to the firing of a biological neuron). An example of the activation function can be a rectified linear unit (ReLU) defined according to the following equation:

$$\text{ReLu}(x) = \{_{0 \text{ for } x<0}^{x \text{ for } x \geq 0} \qquad \text{(Equation 3)}$$

In addition to ReLU, other forms of activation function can also be used including, for example, a softplus function (which can be a smooth approximation of a ReLU function), a hyperbolic tangent function (tanh), an arc tangent function (arctan), a sigmoid function, a Gaussian function, etc.

A processing node of layer 209 (e.g., processing node 210a) may process the sum with the ReLU function to generate a first output of layer 209 based on the following equation:

$$\text{first\_output}_{210a} = \text{ReLU}(\text{Sum}_{210a}) \qquad \text{(Equation 3)}$$

Optionally, prediction model 103 may include a pooling layer to reduce the number of intermediate outputs (e.g., $\text{sum}_{210a}$) of layer 209. The pooling layer may group the intermediate outputs and perform a pooling operation on each group. The pooling operation may include such as max pooling (e.g., selecting a maximum intermediate output within the group), min pooling (e.g., selecting a minimum intermediate output), average pooling (e.g., finding an average of each group), summation pooling (finding a sum of each group), etc., and the reduced intermediate outputs can be processed by the activation function to generate first outputs of layer 209. The pooling operation can be performed to reduce the computation cost associated with activation function processing.

Layer 211 may further process the scaled intermediate outputs from layer 209 by, for example performing additional convolution operations based on different sets of filters. The outputs from each processing node of layer 211 may be forwarded to other higher intermediate layers, or to an output layer (not shown in FIG. 2A). The output layer may form an output vector representing, for example, a probability that certain features are included in image 104, and/or a probability that image 204 includes an image of a panda. For example, the output vector may be compared against a reference vector associated with a nose object of a panda, or a reference vector associated with a panda. A decision about whether image 104 is an image of a panda can be determined based on the comparison result.

Figure 2A:
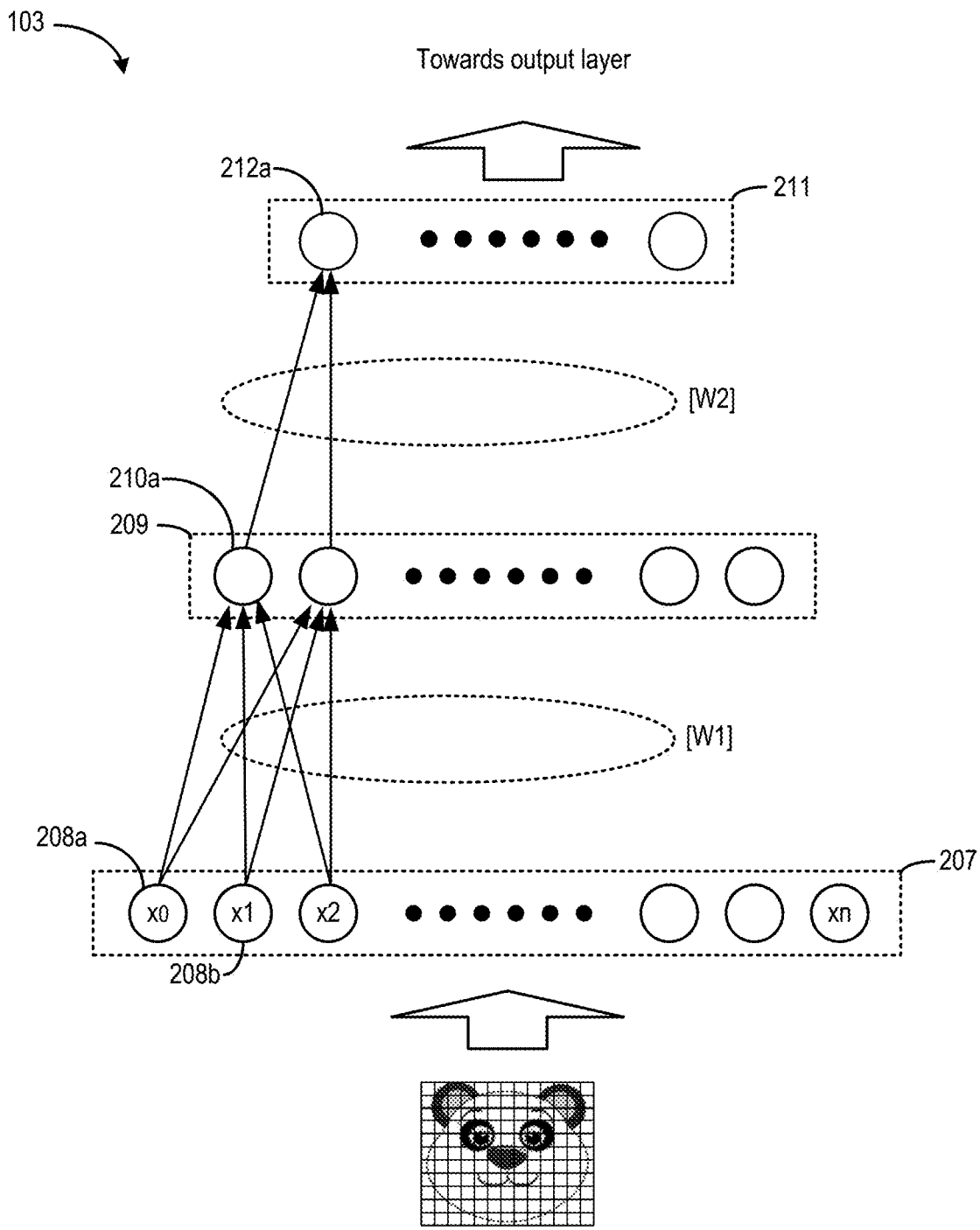
FIGS. 2A-2B are simplified block diagrams illustrating a prediction model and the computations that use techniques disclosed herein, according to certain aspects of the present disclosure.
Figure 2B:
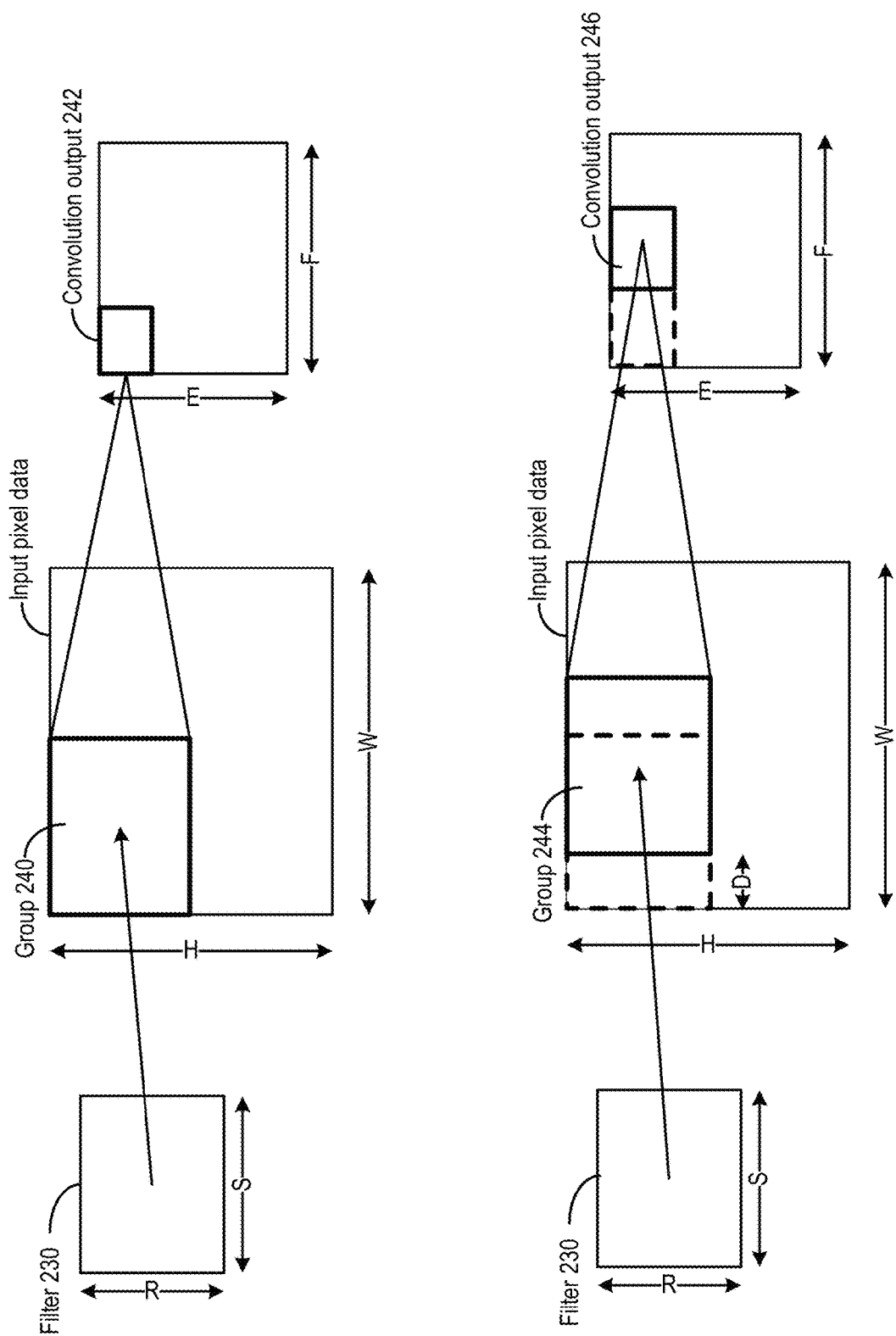
Figure 3:
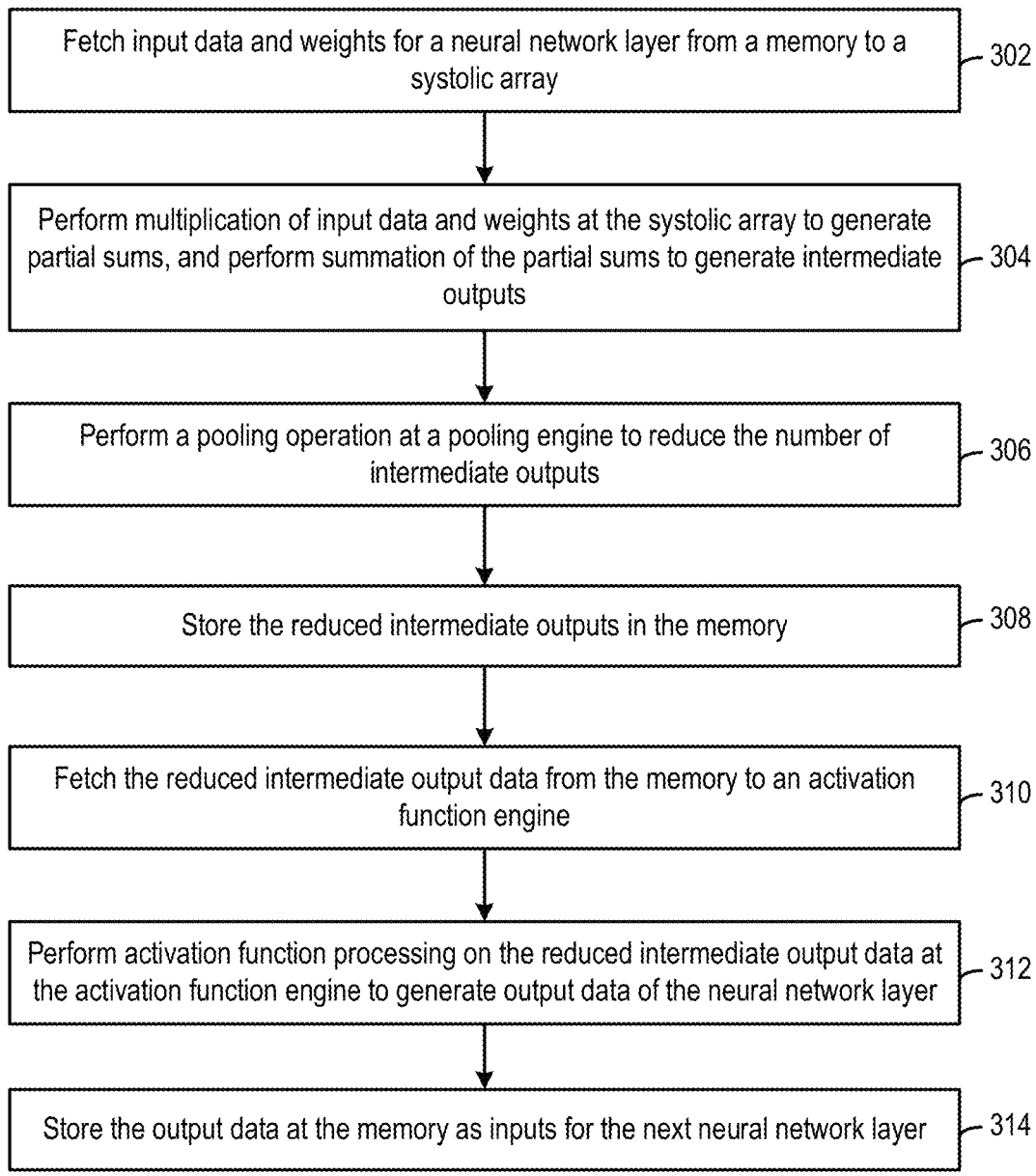
FIG. 3 illustrates an example sequence 300 of operations that can be performed by a neural network accelerator for a particular neural network layer.

The neural network processing described in FIG. 2A and FIG. 2B can be implemented on a neural network accelerator. FIG. 3 illustrates an example sequence 300 of operations that can be performed by a neural network accelerator for a particular neural network layer. The neural network accelerator may include a memory, a systolic array, a pooling engine, and an activation engine.

As shown in FIG. 3, in step 302, input data and weights for a neural network layer can be fetched from the memory to the systolic array.

In step 304, multiplication and summation operations can be performed by the systolic array on the input data and weights to generate intermediate output data. The multiplication and summation operations can be based on Equation 1 above.

In step 306, the systolic array can forward the intermediate output data to the pooling engine to perform a pooling operation (e.g., max pooling, average pooling, etc.) to reduce the number of the intermediate output data.

In step 308, the pooling engine can store the reduced intermediate output data back to the memory. The reduced intermediate output data can overwrite the input data in the memory.

In step 310, the reduced intermediate output data can be fetched from the memory to the activation engine, followed by step 312 where activation function processing can be performed on the reduced intermediate output data to generate output data of the neural network layer based on, for example, Equation 2.

In step 314 the output data of the neural network layer can overwrite the reduced intermediate output data in the memory to provide input data for the next neural network layer.

In performing sequence 300, data can flow between certain portions of the memory and each of the systolic array, the pooling engine, and the activation engine of the neural network processor following a particular order. But in order to test the full capabilities of the neural network processor, the neural network processor can be programmed to perform various other sequences of neural network operations different from sequence 300.

Figure 4A:
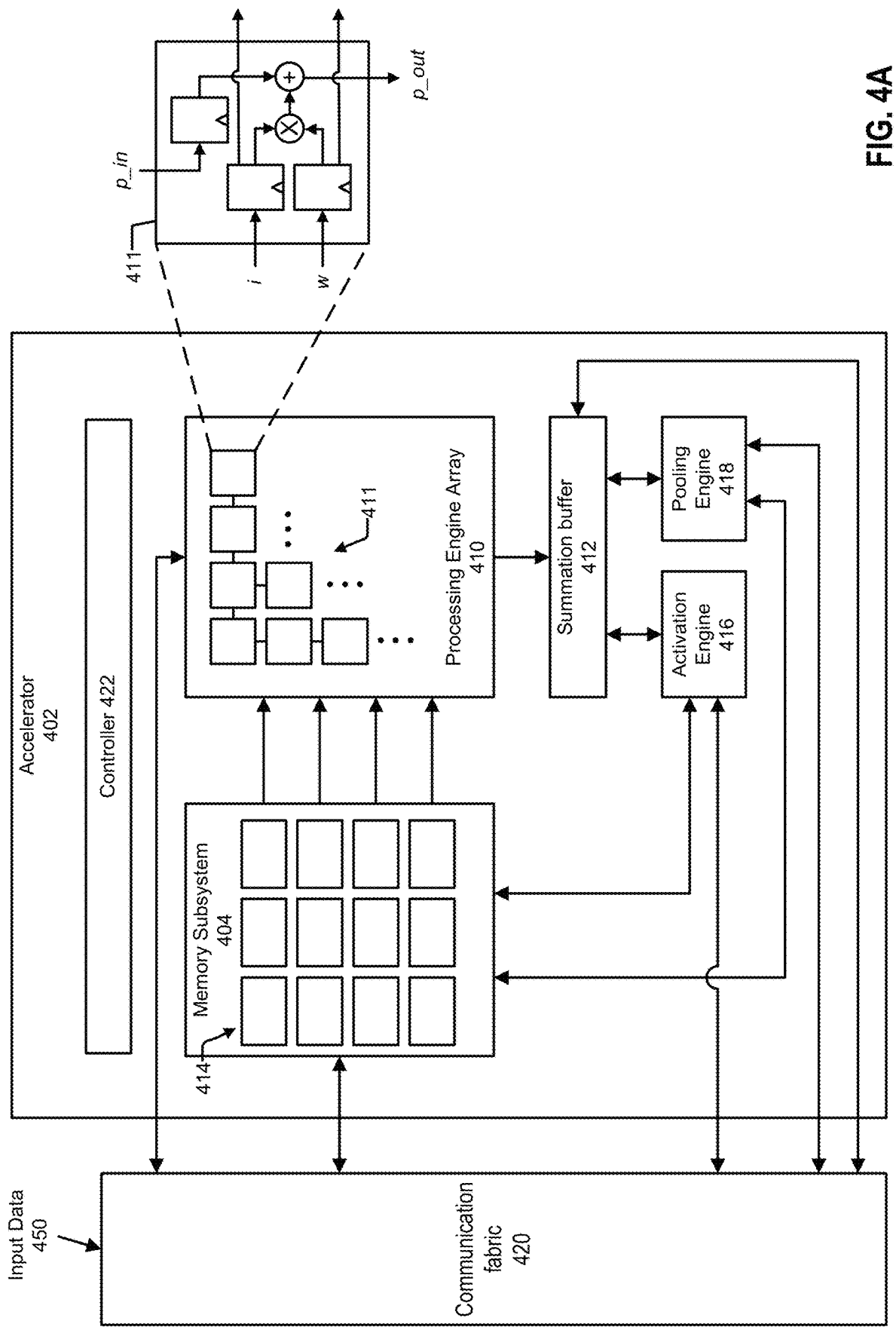

FIG. 4A is a block diagram illustrating an example of an integrated circuit device that can be configured to perform various types of neural network operations, such as those described in FIG. 2A-FIG. 3. The example of FIG. 4 illustrates an accelerator 402. In various examples, the accelerator 402, for a set of input data (e.g., input data 450), can execute computations using a processing engine array 410, an activation engine 416, and/or a pooling engine 418. In some examples, the example accelerator 402 may be an integrated circuit component of a processor, such as a neural network processor. The processor may have other integrated circuit components, including additional accelerator engines. Accelerator 402 may include a controller 422 to control the operations of processing engine array 410, activation engine 416, and/or pooling engine 418.

In various implementations, the memory subsystem 404 can include multiple memory banks 414. In these implementations, each memory bank 414 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 414. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 404 can permit simultaneous access to the read or write channels of multiple memory banks. As another example, the memory subsystem 404 can include arbitration logic such that arbitration between, for example, the outputs of multiple memory banks 414 can result in more than one memory bank's output being used. In these and other examples, though globally managed by the memory subsystem 404, each memory bank can be operated independently of any other.

Having the memory banks 414 be independently accessible can increase the efficiency of the accelerator 402. For example, values can be simultaneously read and provided to each row of the processing engine array 410, so that the entire processing engine array 410 can be in use in one clock cycle. As another example, the memory banks 414 can be read at the same time that results computed by the processing engine array 410 are written to the memory subsystem 404. In contrast, a single memory may be able to service only one read or write at a time. With a single memory, multiple clock cycles can be required, for example, to read input data for each row of the processing engine array 410 before the processing engine array 410 can be started.

In various implementations, the memory subsystem 404 can be configured to simultaneously service multiple clients, including the processing engine array 410, the activation engine 416, the pooling engine 418, and any external clients that access the memory subsystem 404 over a communication fabric 420. In some implementations, being able to service multiple clients can mean that the memory subsystem 404 has at least as many memory banks as there are clients. In some cases, each row of the processing engine array 410 can count as a separate client. In some cases, each column of the processing engine array 410 can output a result, such that each column can count as a separate write client. In some cases, output from the processing engine array 410 can be written into the memory banks 414 that can then subsequently provide input data for the processing engine array 410. As another example, the activation engine 416 and the pooling engine 418 can include multiple execution channels, each of which can be separate memory clients. The memory banks 414 can be implemented, for example, using static random access memory (SRAM).

In various implementations, the memory subsystem 404 can include control logic. The control logic can, for example, keep track of the address spaces of each of the memory banks 414, identify memory banks 414 to read from or write to, and/or move data between the memory banks 414. In some implementations, memory banks 414 can be hardwired to particular clients. For example, a set of memory banks 414 can be hardwired to provide values to the rows of the processing engine array 410, with one memory bank servicing each row. As another example, a set of memory banks can be hard wired to receive values from columns of the processing engine array 410, with one memory bank receiving data for each column.

The processing engine array 410 is the computation matrix of the example accelerator 402. The processing engine array 410 can, for example, execute parallel integration, convolution, correlation, and/or matrix multiplication, among other things. The processing engine array 410 includes multiple processing engines 411, arranged in rows and columns, such that results output by one processing engine 411 can be input directly into another processing engine 411. Processing engines 411 that are not on the outside edges of the processing engine array 410 thus can receive data to operate on from other processing engines 411, rather than from the memory subsystem 404.

In various examples, the processing engine array 410 uses systolic execution, in which data arrives at each processing engine 411 from different directions at regular intervals. In some examples, input data can flow into the processing engine array 410 from the left and weight values can be loaded at the top. In some examples weights and input data can flow from the left and partial sums can flow from top to bottom. In these and other examples, a multiply-and-accumulate operation moves through the processing engine array 410 as a diagonal wave front, with data moving to the right and down across the array. Control signals can be input at the left at the same time as weights, and can flow across and down along with the computation.

In various implementations, the number of columns in the processing engine array 410 determines the computational capacity of the processing engine array 410, and the number of rows determines the required memory bandwidth for achieving maximum utilization of the processing engine array 410. The processing engine array 410 can have, for example, 64 columns and 428 rows, or some other number of columns and rows.

An example of a processing engine 411 is illustrated in FIG. 4 in an inset diagram. As illustrated by this example, a processing engine 411 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 411.

In the illustrated example, an input from above can include a partial sum, p_in, provided either from another processing engine 411 or from a previous round of computation by the processing engine array 410. When starting a computation for a new set of input data, the top row of the processing engine array 410 can receive a fixed value for p_in, such as zero. As illustrated by this example, i and w are multiplied together and the result is summed with p_in to produce a new partial sum, p_out, which can be input into another processing engine 411. Various other implementations of the processing engine 411 are possible.

Outputs from the last row in the processing engine array 410 can be temporarily stored in summation buffer 412. The results can be intermediate results, which can be written to the memory banks 414 to be provided to the processing engine array 410 for additional computation. Alternatively, the results can be final results, which, once written to the memory banks 414 can be read from the memory subsystem 404 over the communication fabric 420, to be output by the system.

In some implementations, the accelerator 402 includes an activation engine 416. In these implementations, the activation engine 416 can combine the results from the processing engine array 410 into one or more output activations. For example, for a convolutional neural network, convolutions from multiple channels can be summed to produce an output activation for a single channel. In other examples, accumulating results from one or more columns in the processing engine array 410 may be needed to produce an output activation for a single node in the neural network. In some examples, activation engine 416 can be bypassed.

In various examples, the activation engine 416 can include multiple separate execution channels. In these examples, the execution channels can correspond to the columns of the processing engine array 410, and can perform an operation on the outputs of a column, the result of which can be stored in the memory subsystem 404. In these examples, the activation engine 416 may be able to perform between 1 and n parallel computations, where n is equal to the number of columns in the processing engine array 410. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 402 can include a pooling engine 418. Pooling is the combining of outputs of the columns of the processing engine array 410. Combining can include for example, computing a maximum value, a minimum value, an average value, a median value, a summation, a multiplication, or another logical or mathematical combination. In various examples, the pooling engine 418 can include multiple execution channels that can operating on values from corresponding columns of the processing engine array 410. In these examples, the pooling engine 418 may be able to perform between 1 and n parallel computations, where n is equal to the number of columns in the processing engine array 410. In various examples, execution channels of the pooling engine 418 can operate in parallel and/or simultaneously. In some examples, the pooling engine 418 can be bypassed.

Herein, the activation engine 416 and the pooling engine 418 may be referred to collectively as execution engines. The processing engine array 410 is another example of an execution engine. Another example of an execution engine is a Direct Memory Access (DMA) engine, which may be located outside the accelerator 402.

Input data 450 can arrive over the communication fabric 420. The communication fabric 420 can connect the accelerator 402 to other components of a processor, such as a DMA engine that can obtain input data 450 from an Input/Output (I/O) device, a storage drive, or a network interface. The input data 450 can be, for example one-dimensional data, such as a character string or numerical sequence, or two-dimensional data, such as an array of pixel values for an image or frequency and amplitude values over time for an audio signal. In some examples, the input data 450 can be three-dimensional, as may be the case with, for example, the situational information used by a self-driving car or virtual reality data. In some implementations, the memory subsystem 404 can include a separate buffer for the input data 450. In some implementations, the input data 450 can be stored in the memory banks 414 when the accelerator 402 receives the input data 450.

In some examples, the accelerator 402 can implement a neural network processing engine. In these examples, accelerator 402, for a set of input data 450, can execute a neural network to perform a task for which the neural network was trained. Executing a neural network on a set of input data can be referred to as inference or performing inference.

The weights for the neural network can be stored in the memory subsystem 404, along with input data 450 on which the neural network will operate. The addresses of the weights and input data 450 in memory subsystem 404 can be based on or mapped to the coordinates of the weights and input data 450 in, respectively, a weight data array and an input data array, which allows the weight and the input data to be retrieved based on addresses derived from their coordinates. The neural network can also include instructions, which can be executed by controller 422 to control the processing engine array 410 to perform various computations on the weights and the input data. The instructions can be generated by a compiler and can also be stored in the memory subsystem 404, in the memory banks 414 or in a separate instruction buffer. The processing engine array 410 can output intermediate results, which represent the outputs of individual layers of the neural network. In some cases, the activation engine 416 and/or pooling engine 418 may be enabled for computations called for by certain layers of the neural network. The accelerator 402 can store the intermediate results in the memory subsystem 404 for inputting into the processing engine array 410 to compute results for the next layer of the neural network. The processing engine array 410 can further output final results from a last layer of the neural network. The final results can be stored in the memory subsystem 404 and then be copied out to host processor memory or to another location.

As shown in FIG. 4B, in accelerator 402, processing engine array 410, activation engine 416, and pooling engine 418 can form a distributed system having shared access to memory subsystem 404. As described above, processing engine array 410 can fetch weights and input data (e.g., input data 450) from memory subsystem 404. Moreover, depending on the order of pooling and activation function processing, each of activation engine 416 and pooling engine 418 can fetch intermediate output data from memory subsystem 404, perform the post-processing on the data, and store the post-processed data back to memory subsystem 404. In addition, each of processing engine array 410, activation engine 416, and pooling engine 418 can access the same region of memory subsystem 404 (e.g., memory bank 414a) used to store the post-processed data from activation engine 416/pooling engine 418 as output data of a neural network layer. The output data can be fetched as input data to processing engine array 410 to perform computations for the next neural network layer.

Each of processing engine 410, activation engine 416, and pooling engine 418 may execute instructions in parallel to perform the respective operations. As each of these execution engines may try to access the same shared resource (e.g., memory bank 414a), the access operations by the different execution engines need to be properly synchronized among each other to ensure that memory bank 414a has a deterministic state. For example, the read operation by processing engine array 410 needs to have a fixed and deterministic timing relationship with respect to the write operations by activation function engine 416 and pooling engine 418, so that the data fetched by processing engine array 410 have a deterministic state (e.g., being the outputs of activation engine 416 of the previous network layer).

In some examples, accelerator 402 can employ an event system to synchronize the memory access operations between two execution engines. An event is also generally known as "conditional variable" and "message" which can be passed from one execution engine to another. FIG. 4C illustrates an example of an event-based synchronization operation. As shown in FIG. 4C, execution engine A (e.g., pooling engine 418) can write to address 0x0 of memory bank 414a at time 0, and then execute a SET instruction to set an event X ("SET X") at time 1. By executing the SET instruction to set event X, execution engine A becomes a producer of event X. Meanwhile, execution engine B (e.g., activation engine 416) can execute a WAIT-and-CLEAR instruction to event X ("WAIT AND CLEAR X") at time 2. By executing the WAIT-and-CLEAR instruction to clear event X, execution engine B becomes a consumer of event X. Following the completion of the WAIT-and-CLEAR instruction at time 2, execution engine B can read address 0x0 of memory bank 414a at time 3 to obtain, for example, the reduced intermediate outputs generated by pooling engine 418. By synchronizing the read and write operations to address 0x0 of memory bank 414a between execution engines A and B, the state of memory bank 414a can become deterministic. Moreover, as the write operation by execution engine A is performed before the SET instruction, whereas the read operation by execution engine B is performed after the WAIT-and-CLEAR instruction, it can be guaranteed that execution engine B can receive the update made to address 0x0 by execution engine A.

Referring back to FIG. 4C, the passing of event X from a producer to a consumer can be based on an event register 440 of accelerator 402. Execution engine A can execute the SET instruction to change a value stored in event register 440 to a first value (e.g., a logical one). Execution engine B can execute the WAIT instruction to monitor for the value stored in event register 440. When a logical one is detected at event register 440, execution engine B can execute the CLEAR instruction to change the value stored in event register 440 to a second value (e.g., a logical zero) to clear event X.

The pair of SET and WAIT (or WAIT-AND-CLEAR) instructions can be used to define the timing relationship between the memory access operations by the producer and consumer execution engines, which can govern the scheduling of the memory access instructions (e.g., write, read, etc.) among the execution engines. For example, referring to FIG. 4D, execution engine B should not execute a write instruction to address 0x0 before the WAIT-and-CLEAR instruction as the timing relationship between the write instructions by execution engines A and B become undefined, which can put address 0x0 in a non-deterministic state, as it becomes unclear what data is being stored at address 0x0.

Although two execution engines can be synchronized by the SET and WAIT (or WAIT-AND-CLEAR) instructions, those instructions also need to be synchronized among the execution engines to ensure that the state of the event is also deterministic. As synchronization is based on the state of the event (e.g., wait till the event is set, and then clear), non-deterministic event state can cause synchronization failure. For example, referring to FIG. 4E, if execution engine A executes another SET event X instruction at the same time T2 as execution engine B executes the WAIT-AND-CLEAR event X instruction, the state of event X (e.g., whether it has been set or cleared) can become non-deterministic. Moreover, if other execution engines also execute WAIT-AND-CLEAR event X instructions, those instructions may also not be synchronized with the SET event X instruction at execution engine A due to the non-deterministic state of event X. The event-based synchronization scheme may fail as a result.

Typically the programming of various execution engines of accelerator 402, including processing engine array 410, activation engine 416, and pooling engine 418, can be performed by a human programmer to execute a particular sequence of neural network operations, such as sequence 300 of FIG. 3. However, an automatic test generator may be used to generate test instructions to cover a large number of test scenarios for processing engine array 410, activation engine 416, and pooling engine 418. The test scenarios can cover, for example, different sequences of data flows between memory subsystem 404 and each of processing engine array 410, activation engine 416, and pooling engine 418, to ensure that these execution engines have the capability to handle the data flows correctly. The test scenarios can also cover, for example, different ordering of input-weight multiplication and summation operations (e.g., step 304 of FIG. 3), pooling operation (e.g., step 306 of FIG. 3), and activation function processing (e.g., step 312 of FIG. 3) to cover other existing or future neural network topologies, and the execution engines can be programmed according those test scenarios to ensure that they can handle computations for those neural network topologies properly. The test scenarios can also cover stress testing the execution engines.

In some examples, to expand the scope of tests, a test generator can generate a randomized program of instructions for each execution engine. The test generator can randomly select an instruction from a set of supported instructions based on a random function. The test generator can also set the parameters of the instructions (e.g., a write/read address, an event being set/cleared, etc.), and determine which execution engine to assign the instruction to, based on the same or a different random function. With such arrangements, each execution engine can receive completely randomized programs of instructions, which can broaden the scope of the test. For example, the randomized programs of instructions can provide a larger variety of different sequences of data flows between memory subsystem 404 and each of processing engine array 410, activation engine 416, and pooling engine 418. As another example, the randomized programs of instructions can provide a larger variety of ordering of input-weight multiplication and summation operations, pooling operation, and activation function processing to cover a wider range of neural network topologies. Although randomized programs can provide a broader test scope, randomized instructions that access the same resource needs to be have a deterministic timing relationship such that the resource can have a deterministic state.

Figure 5A:
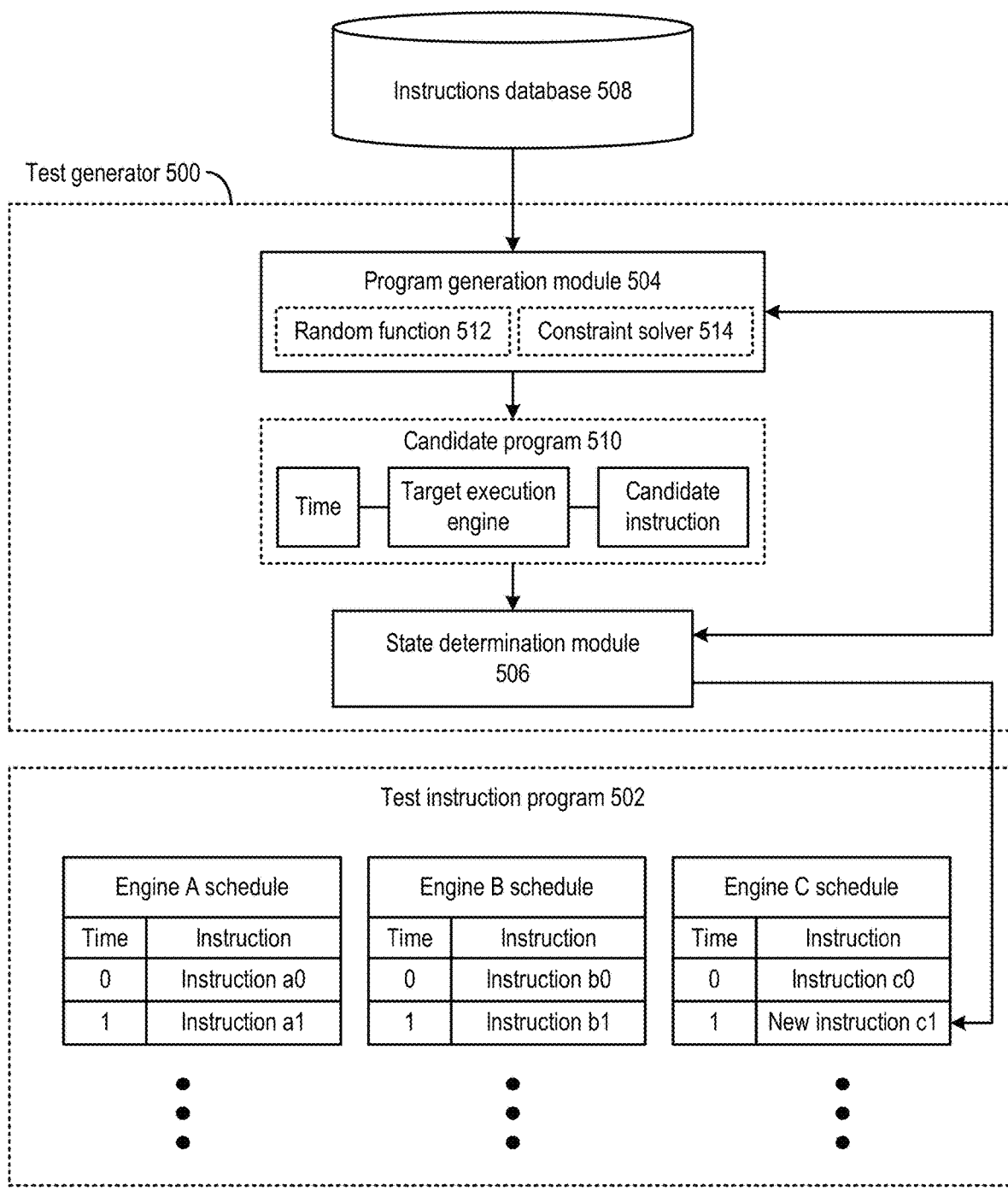
Figure 5C:
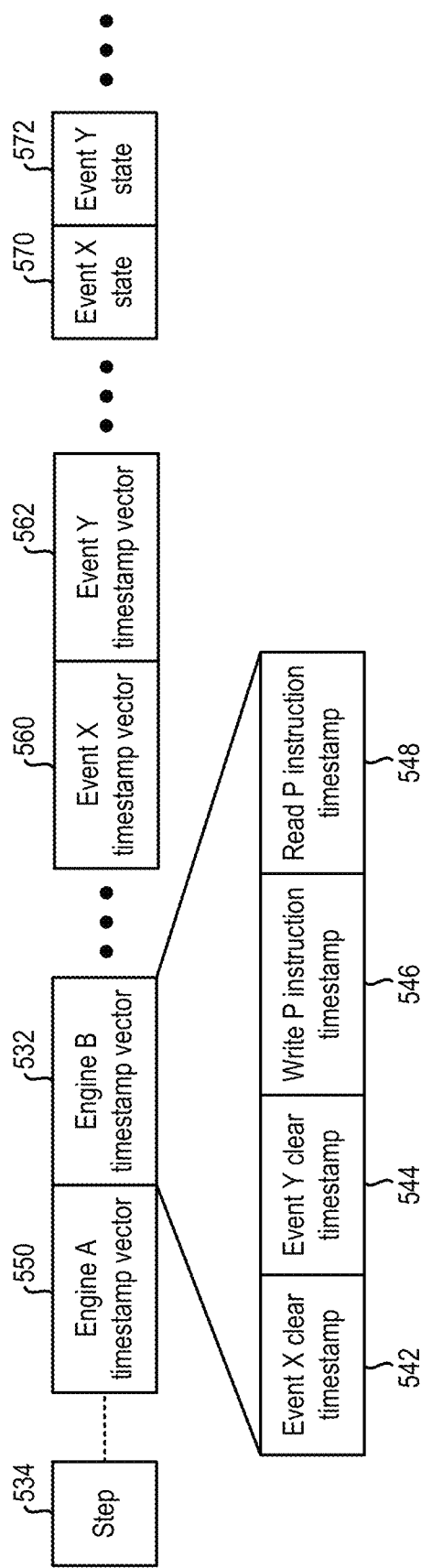

FIG. 5A-FIG. 5C illustrate examples of a test generator 500 and its operations. Test generator 500 can generate a test instruction program 502. Test instruction program 502 can include a set of randomized instructions for each execution engine of a plurality of execution engines of a distributed system, as well as the scheduled time of execution of each instruction at each execution engine. As to be described below, test generator 500 can employ a logical timestamp system to determine whether a random instruction, when executed by a target execution engine, puts a shared resource in a non-deterministic state. If it is, test generator 500 can regenerate a different instruction either for the target execution engine or for another execution engine. Test generator 500 can be part of a test generation application, a simulation application, an electronic design automation (EDA) application, etc.

As shown in FIG. 5A, test generator 500 includes a program generation module 504 and a state determination module 506. Program generation module 504 can be coupled with an instructions database 508. Program generation module 504 can select a candidate instruction from instructions database 508, determine a parameter (e.g., a memory address for a write/read instruction, an identifier of an event to be set/cleared, etc.) of the candidate instruction, assign the instruction to a target execution engine of the plurality of execution engines, schedule the time of execution of the instruction at the target execution engine, and generate a candidate program 510 including the scheduled time of execution, the assigned target execution engine, and the candidate instruction.

The selection of instructions, the determination of parameters, as well as the assignment of the instructions to the target execution engines can be based on invoking a random function 512 and/or a constraint solver 514. For example, each instruction in instructions database 508, as well as each execution engine, can be associated with a numerical identifier. Program generation module 504 can invoke random function 512 to generate random numbers and to select the instructions and the execution engines having numerical identifiers matching the random numbers. Program generation module 504 can also generate the parameters based on the random numbers. As to be described below, state determination module 506 can determine whether the instruction satisfies a set of rules which indicates whether the instruction can cause a shared resource (e.g., memory, event, etc.) and/or the distributed system under test to enter a non-deterministic state. If the instruction does not satisfy the rules, program generation module 504 can discard the instruction and invoke random function 512 again to generate another instruction. As another example, the selection of instructions can be based on invoking constraint solver 514 which selects, based on a test pattern, an instruction that also satisfy the rules. Constraint solver 514 can receive information from state determination module 506 to make a determination that the instruction satisfy the rules. In some examples, as to be described below, program generation module 504 can invoke both random function 512 and constraint solver 514 to generate an instruction.

Program generation module 504 can generate one generate candidate program 510 in one generation step. In each generation step, program generation module 504 can invoke random function 512 and/or constraint solver 514 to select an instruction from instructions database 508, generate a parameter for the instruction, and select a target execution engine to receive the instruction, as described above. Program generation module 504 can then schedule the time of execution of the instruction at the target execution engine to form candidate program 510. The scheduling can be based on other instructions that have been scheduled for the execution engine, and based on whether the instruction has any synchronization dependency with other instructions, such as a WAIT-AND-CLEAR instruction.

FIG. 5B illustrates an example sequence of generation and scheduling of instructions by program generation module 504. In FIG. 5B, table 520 illustrates a sequence of generation steps performed by program generation module 504 to generate instruction programs for two execution engines Engine A and Engine B, whereas table 530 illustrates the instruction programs for Engine A and Engine B a result of the scheduling operation by program generation module 504. As shown in FIG. 5B, in generation step 0, program generation module 504 can invoke random function 512 and/or constraint solver 514, generate a SET event X (SET X) instruction, and assign it to Engine A. Program generation module 504 can schedule Engine A to execute the SET X instruction at time 0 as the first instruction to be executed by Engine A.

In generation step 1, program generation module 504 can invoke random function 512 and/or constraint solver 514, generate a write instruction to address P (write P), and assign it to Engine A, and schedule Engine A to execute the write P instruction at time 1 following SET X.

In generation step 2, program generation module 504 can invoke random function 512 and/or constraint solver 514, generate a WAIT-AND-CLEAR X instruction, and assign it to Engine B. As the WAIT-AND-CLEAR X instruction needs to be synchronized with the SET X instruction, but can be executed in parallel with the write P instruction, program generation module 504 can schedule Engine B to execute the WAIT-AND-CLEAR X instruction at time 1.

In generation step 3, program generation module 504 can invoke random function 512 and/or constraint solver 514, generate a second write P instruction, and assign it to Engine A. Program generation module 504 can schedule Engine A to execute the second write P instruction at time 2 following the first write P instruction.

In generation step 4, program generation module 504 can invoke random function 512 and/or constraint solver 514, generate a write instruction to address Q (write Q), and assign it to Engine B. As the write Q instruction has no synchronization dependency with the instructions of Engine A, program generation module can schedule Engine B to execute the write Q instruction at time 2, in parallel with the execution of the second write P instruction at Engine A.

Referring back to FIG. 5A, in one example, after program generation module 504 generates a candidate program 510 based on random function 512, state determination module 506 can determine whether to insert candidate program 510 into test instruction program 502 based on whether the candidate program puts a shared resource (e.g., an event, an address/region of a memory) in a non-deterministic state. State determination module 506 can maintain a logical timestamp for each shared resource. State determination module 506 can determine whether the execution of the candidate instruction by the target execution engine at the scheduled time, as specified in candidate program 510, puts a shared resource into a non-deterministic state. If candidate program 510 puts the shared resource into a non-deterministic state, program generation module 504 can remove candidate program 510 and regenerate another one, either for the same target execution engine or for another engine based on random function 512.

As another example, state determination module 506 can also provide the logical timestamp information of the shared resources to constraint solver 514, which can generate candidate program 510 based on a pre-determined test pattern and under the constraints of the logical timestamp information. For example, constraint solver 514 may generate an instruction based on a Markov chain model, which sets a probability of generating a new instruction based on a prior instruction. The new instruction can be randomly selected from a pool of instructions determined based on the prior instruction, and based on invoking random function 512 to reflect the probability. The new instruction is also selected under the constrains set upon by the logical timestamps of the shared resources provided by state determination module 506, to ensure that the new instruction does not put any shared resource into a non-deterministic state.

In some examples, to avoid a dead-end situation where there is no available instruction to keep the shared resource in a deterministic state (e.g., one of the execution engines being selected to set all the available events, perform a majority of the write operations, etc.), state determination module 506 can start from the current generation step, move backward and regenerate some of the instructions approved in previous generation steps. On the other hand, if candidate program 510 keeps the shared resource in a deterministic state, program generation module 504 can insert the candidate program 510 into test instruction program 502 for the target execution engine at the scheduled time slot. For example, as shown in FIG. 5A, program generation module 504 can insert a new instruction c1 for Engine C to be executed at time 1 based on candidate program 510.

FIG. 5C illustrates information stored in state determination module 506 to determine whether a candidate program puts a shared resource in a non-deterministic state. State determination module 506 can track a logical timestamp vector, such as logical timestamp vector 532, which includes a logical timestamp for each shared resource with respect to a generation step 534 at test generator 500. As shown in FIG. 5C, logical timestamp vector 540 may include a timestamp 542 for a WAIT-AND-CLEAR instruction for event X, a timestamp 544 for a WAIT-AND-CLEAR instruction for event Y, a timestamp 546 for a write instruction to address P, a timestamp 548 for a read instruction to address P, etc. Logical timestamp vector 540 may also include a timestamp for other address/regions of the memory. A logical timestamp can track a history of accesses of a resource. A logical timestamp can include a value indicative of when an access operation was last executed. In some examples, a logical timestamp for a resource can be initialized at zero, and can be incremented whenever the resource is accessed. For example, timestamps 542 and 544 can represent when a WAIT-AND-CLEAR instruction for, respectively, events X and Y was last executed. Timestamps 546 and 548 can represent when, respectively, a write instruction and a read instruction to address P was last executed. Logical timestamp vector 540 may also include a timestamp for write instructions and read instructions to other addresses. In a case where a timestamp is assigned to a region, the timestamp can be updated for each instruction that accesses an address within the region. The size and location of a memory region assigned with a timestamp can be either static, or dynamically updated by test generator 500 when generating the instructions. The logical timestamp for the memory regions can be updated when the sizes/locations of the memory regions are updated.

State determination module 506 can maintain a local logical timestamp vector of the shared resources for each execution engine (engine logical timestamp vector), including engine logical timestamp vector 550 for execution engine A, engine logical timestamp 540 for execution engine B, etc. The engine logical timestamp vector can represent a history of accesses of the shared resource by a particular execution engine, or a history of accesses that is visible to the execution engine. In addition, state determination module 506 can also maintain a local logical timestamp vector of the shared resource for each event (event logical timestamp vector), including event logical timestamp vector 560 for event X, logical timestamp vector 562 for event Y, etc. State determination module 506 also tracks a state of each event, including state 570 for event X and state 572 for event Y.

The event logical timestamp vector is used to transfer an access history of a resource, as represented by an engine logical timestamp vector, from one execution engine to another execution engine as part of a synchronization operation based on the execution of SET and WAIT-AND-CLEAR instructions. Specifically, when a first execution engine executes a SET instruction to set a first event and becomes a producer of the first event, the engine timestamp vector of the first execution engine, which represents a history of accesses of a shared resource by the first execution engine or the history that is visible to the engine, can be copied to the event timestamp vector of the first event. A second execution engine can execute a WAIT-AND-CLEAR instruction to clear the first event and become a consumer of the second event. As a consumer, the second execution engine can combine its engine timestamp vector with the event timestamp vector of the second event to generate a new engine timestamp vector, which represents a combined history of accesses of the shared resource that is visible to the second execution engine up to that time point. The second execution engine can also update the timestamp of the first event in the new engine timestamp vector to record its clearing of the first event. If the second execution engine also accesses other shared resources (e.g., the memory) after the WAIT-AND-CLEAR instruction, the second execution engine can also update the timestamp of that shared resource in the new engine timestamp vector. The new engine timestamp vector can be passed over to another execution engine when the second execution engine executes a SET instruction to set the first event or another event. In some examples, an execution engine can update the timestamp of a shared resource upon accessing the resource by incrementing the timestamp, with a larger timestamp representing a later access or a later version. The combining of the engine timestamp vector and the event timestamp vector can be based on finding a maximum of the timestamps of the shared resource between the two timestamp vectors.

To prevent providing an instruction to an execution engine that can lead to a non-deterministic state of the shared resource, the test generator can enforce a number of rules concerning the SET instruction (for an event) and the write instruction (for an address of a memory) to determine whether to provide the SET instruction and the write instruction to an execution engine. The determination can be based on whether the timestamp of the shared source (event, memory, etc.) in the engine timestamp vector of the execution engine is the most up-to-date. The enforcement of the rules can be based on, for example, discarding instructions (e.g., generated solely as random instructions based on random function 512) that do not satisfy the rules, or based on constraining the generation of the instructions by constraint solver 514 based on the rules.

Specifically, the test generator can first determine a state of the first event in the generation step. If the first event is in the set state, the test generator can discard a newly-generated SET instruction and regenerate another instruction for the first execution engine, or set a constraint at constraint solver 514 to ensure that the new instruction for the first execution engine does not set the state of the first event. Next, the test generator can determine whether the first execution engine, at the first time, has the most recent logical timestamp of the first event in its engine timestamp vector. The test generator can determine the most recent timestamp of the first event in the generation step by finding a maximum of the timestamp of the first event among the engine timestamp vectors of all of the execution engines, and compare it with the timestamp of the first event in the engine timestamp vector of the first execution engine. If the two timestamps do not match, the test generator can discard a newly-generated SET instruction and regenerate another instruction for the first execution engine (or for other execution engines), or set a constraint to ensure that the new instruction for the first execution engine does not set the state of the first event.

FIG. 6A illustrates an example sequence of generation of SET and WAIT-AND-CLEAR instructions of the events based on state determination module 506 tracking and enforcing rules for the logical timestamps of the events. FIG. 6A illustrates, on the left, an example sequence of generation of candidate program 510, and on the right, the engine logical timestamp vectors, event logical timestamp vectors, and states of the events corresponding to each candidate program 510 approved by state determination module 506. As shown in FIG. 6A, at each generation step, program generation module 504 can generate a candidate instruction for one of execution engines A, B, or C. Two events X and Y are shared among the execution engines. Moreover, state determination module 506 maintains engine logical timestamp vectors 602, 604, and 606 for, respectively, execution engines A, B, and C. State determination module 506 also maintains event logical timestamp vectors 612 and 614 for events X and Y, as well as states 622 and 624 for events X and Y. In the example of FIG. 6A, a logical timestamp vector, in the format of {T1, T2}, includes a first logical timestamp (T1) of a WAIT-AND-CLEAR instruction on event X and a second logical timestamp (T2) of a WAIT-AND-CLEAR instruction on event Y. Each engine logical timestamp vector and event logical timestamp vector can be initialized to {0, 0}, whereas the states of events X and Y can be initialized to a clear state (e.g., logical zero).

In generation step 0, execution engine A can be selected to execute a SET X instruction, and state determination module 506 can put event X into a set state (e.g., logical one). State determination module 506 approves execution engine A to execute the SET X instruction because event X is in the clear state and is available to be set. Moreover, event X has not been updated before and each engine has the most up-to-date timestamp of event X (which is 0). Therefore, state determination module 506 allows execution engine A to execute the SET X instruction to set event X, and event X can enter the set state. As a result of the SET X instruction, state determination module 506 also copies the values of engine logical timestamp 602 (of execution engine A) into event logical timestamp 612 (of event X). As engine logical timestamp 602 is at {0,0}, event X logical timestamp vector 612 also becomes {0,0}.

In generation step 1, execution engine B can be selected to execute a WAIT-AND-CLEAR instruction to clear the state of event X. State determination module 506 allows execution engine B to execute the WAIT-AND-CLEAR instruction because event X is in the set state and is available to be cleared. As a result of the WAIT-AND-CLEAR instruction, state determination module 506 combines engine logical timestamp vector 604 (of execution engine B) in generation step 1 with event logical timestamp vector 612 by finding a maximum for each logical timestamp between the logical timestamp vectors to obtain an intermediate engine logical timestamp vector 604, as follows:

$$\text{intermediate logical engine vector} = \{\max(T1_{event\_vector}, T1_{engine\_vector}), \max(T2_{event\_vector}, T2_{engine\_vector})\} \quad \text{(Equation 4)}$$

In Equation 4, $T1_{event\_vector}$ and $T2_{event\_vector}$ can refer to, respectively, the first logical timestamp and the second logical timestamp of the event logical timestamp vector of an event being cleared by the WAIT-AND-CLEAR instruction, whereas $T1_{engine\_vector}$ and $T2_{engine\_vector}$ can refer to the first logical timestamp and the second logical timestamp of the engine logical timestamp vector of the execution engine that executes the WAIT-AND-CLEAR instruction. The max operations can represent a combined history of accesses of the shared resource that is visible to the second execution engine up to that generation step. In FIG. 6A, state determination module 506 can determine that intermediate logical engine vector of engine B in generation step 1 is (0, 0) based on {max(0,0), max(0,0)}, which represents the combined history of accesses of events X and Y up to time 1.

State determination module 506 can then increment the timestamp of the event being cleared by the WAIT-AND-CLEAR instruction (first timestamp for event X) in the intermediate logical engine vector to update the access history of event X. As shown in FIG. 6A, in generation step 1, engine logical timestamp vector 606 of execution engine B becomes {1, 0} in generation step 1. The state of event X also returns back to the clear state in generation step 2.

In generation step 2, execution engine B can be selected to execute a SET Y instruction, and state determination module 506 can put event Y into a set state. State determination module 506 allows execution engine B to execute the SET Y instruction because event Y is in the clear state and is available to be set. Moreover, event Y has not been accessed before, and each execution engine has the most up-to-date timestamp of event Y (which is 0). Therefore, state determination module 506 allows execution engine B to execute the SET Y instruction to set event Y, and event Y can enter the set state. As a result of the SET Y instruction, state determination module 506 also copies the values of engine logical timestamp 604 (of execution engine B) in generation step 2 into event logical timestamp 614 (of event Y). As engine logical timestamp vector 602 at execution engine B is at {1,0} in generation step 2, event Y's logical timestamp vector 614 also becomes {1,0}.

In generation step 3, execution engine C can execute a WAIT-AND-CLEAR instruction to clear the state of event Y. State determination module 506 allows execution engine C to execute the WAIT-AND-CLEAR instruction because event Y is in the set state in generation step 3 and is available to be cleared. As a result of the WAIT-AND-CLEAR instruction, state determination module 506 combines engine logical timestamp vector 606 (of execution engine C) in generation step 3 with event logical timestamp vector 614 of event Y based on Equation 4 above to obtain an intermediate engine logical timestamp vector 606. Intermediate engine logical timestamp vector 606 can be determined based on {max(1,0), max(0,0)} and becomes {1,0}. Moreover, state determination module 506 also increments the second logical timestamp for event Y in intermediate engine logical timestamp vector 606, and engine logical timestamp vector 606 can become {1,1} as a result. The state of event Y also returns back to the clear state.

Execution engine A is then selected to execute another SET X instruction in generation step 4. However, state determination module 506 can reject the selection and prevent the insertion of SET X into the scheduled time for execution engine A in test instruction program 502, either by discarding the instruction or by setting a constraint at constraint solver 514 to prevent it from generating the SET X instruction in generation step 4. Specifically, although event X is in a clear state and is available to be set, state determination module 506 can determine that execution engine A does not have the most up-to-date logical timestamp of event X in generation step 4. State determination module 506 can determine the most up-to-date logical timestamp of event X by finding a maximum of the event X logical timestamp among the engine logical timestamps 602, 604, and 606 in generation step 4, which is 1. On the other hand, the logical timestamp of event X in engine logical timestamp vector 602 of execution engine A is zero. As execution engine A does not have the most up-to-date logical timestamp of event X, state determination module 506 can reject the selection of engine A for the SET X instruction, and program generation module 504 can regenerate a different instruction/program. Such arrangements allow a deterministic hierarchy of dependency of event X to be established. Without such arrangements, Engine A may be scheduled to execute the second SET X instruction immediately after the first SET X instruction or after the WAIT-AND-CLEAR X instruction. As the order of updating of event X is non-deterministic, double setting of event X may result, and the state of event X can become non-deterministic as well. With such arrangements, the order of updating of event X can become deterministic, while double setting of event X before event X is cleared can also be prevented, all of which can ensure that the state of event X is deterministic. Moreover, as event X also has the function of conveying the logical timestamp vector of other shared resources, such arrangements also ensure that the consumer execution engine can receive the most up-to-date logical timestamp vector from event X (and from the execution engine that executes the SET X instruction).

In generation step 5, execution engine C can execute the SET X instruction. State determination module 506 allows execution engine C to execute the SET X instruction at time 5 because it has the most up-to-date logical timestamp of event X (which is 1). As a result of the SET X instruction, event logical timestamp 612 of event X can receive engine logical timestamp vector 606 of engine C in generation step 5, which is {1,1}. In the example of FIG. 6A, engine B can also be selected (in lieu of engine C) to execute the set X instruction in generation step 5 as engine B also has the most up-to-date logical timestamp of event X.

In addition, state determination module 506 allows an execution engine to execute a write instruction to an address only if the execution engine has the most up-to-date timestamps of read and write instructions executed to that address, and to execute a read instruction to an address only if the execution engine has the most up-to-date timestamp of write instruction. Such arrangements allow the order of write to an address to be deterministic, which can ensure that the state of the address is deterministic. Moreover, as a read instruction is allowed only after the latest write instruction, the read data from the memory, and the state of the execution engine that executes the read instruction, can also be deterministic.

FIG. 6B illustrates example sequences of generation of write and read instructions based on state determination module 506 tracking and enforcing rules for the logical timestamps of write instructions and read instructions. FIG. 6B illustrates, on the left, an example sequence of generation of candidate program 510, and on the right, the engine logical timestamp vectors, event logical timestamp vectors, and states of the events corresponding to each candidate program 510 approved by state determination module 506. As shown in FIG. 6B, at each generation step program generation module 504 can generate a candidate instruction for one of execution engines A or B. Two events X and Y are shared among the execution engines. Moreover, state determination module 506 maintains engine logical timestamp vectors 632 and 634 for, respectively, execution engines A and B. State determination module 506 also maintains event logical timestamp vectors 642 and 644 for events X and Y, as well as states 622 and 624 for events X and Y. In the example of FIG. 6B, a logical timestamp vector can have a format of {T1, T2, T3.T4T5}. T1 can represent a first timestamp of execution of a WAIT-AND-CLEAR instruction on event X. T2 can represent a second timestamp of execution of a WAIT-AND-CLEAR instruction on event Y. T3 can represent a third timestamp of a write instruction executed (by execution engine A or execution engine B) on an address P of a memory. T4 is a fourth timestamp of a read instruction executed by execution engine A on address P. T5 is a fifth timestamp of a read instruction executed by execution engine B on address P. Each engine logical timestamp vector and event logical timestamp vector can be initialized to {0,0,0.00}, whereas the states of events X and Y can be initialized to a clear state (e.g., logical zero). As to be described below, only one timestamp is used to track write instructions because the write instructions need to be serialized to ensure that the address has a deterministic state, but read instructions to the same address can be executed by different execution engines in parallel, since read instructions do not change the state of the address.

In generation step 0, execution engine A can be selected to execute a write P instruction to write data to address P of the memory. State determination module 506 approves execution engine A to execute the write P instruction because address P has not been read or written before and each engine has the most up-to-date write and read timestamps (which are 0). State determination module 506 also increments the logical timestamp of write instruction (T3) of engine logical timestamp vector 632 of execution engine A by one. Engine logical timestamp vector 632 becomes {0,0,1.00} after generation step 0.

In generation step 1, execution engine A can be selected to execute a SET X instruction after the write P instruction to set event X. State determination module 506 can approve execution engine A to execute the SET X instruction because event X has not been updated before, and each execution engine, including execution engine A, has the most up-to-date logical timestamp of event X (which is 0). Event X can enter the set state. As a result of the SET X instruction, state determination module 506 also copies the values of engine logical timestamp 632 (of execution engine A) in generation step 1 into event logical timestamp 642 (of event X). Event X logical timestamp vector 642 becomes {0,0,1.00} after generation step 1.

In generation step 2, execution engine A can be selected to execute a read P instruction to read data from address P of the memory, after the execution of write P and SET X instructions. State determination module 506 allows execution engine A to execute read P instruction because execution engine A has the most up-to-date timestamp of write instruction. State determination module 506 can determine the most up-to-date timestamp of write instruction by finding maximum of the write instruction timestamp among the engine logical timestamp vectors 632 and 634 of execution engines A and B, which is 1 in FIG. 6B. Such arrangement ensures that execution engine A is reading the most up-to-date memory. State determination module 506 also increments the logical timestamp of read instruction by execution engine A (T4) of engine logical timestamp vector 632 of execution engine A by one. Engine logical timestamp vector 632 becomes {0,0,1.10} after generation step 2.

In generation step 3, execution engine A can be selected to execute a SET Y instruction after the write P, set X, and the read P instructions to set event Y. State determination module 506 can approve execution engine A to execute the SET Y instruction because event Y has not been updated before, and each execution engine, including execution engine A, has the most up-to-date logical timestamp of event Y (which is 0). Event Y can enter the set state. As a result of the SET Y instruction, state determination module 506 also copies the values of engine logical timestamp 632 (of execution engine A) in generation step 3 into event logical timestamp 644 (of event Y). Event Y logical timestamp vector 644 becomes {0,0,1.10} after generation step 3.

In generation step 4, execution engine B can be selected to execute a read P instruction. However, state determination module 506 can reject the selection and prevent the insertion of the read P instruction into the scheduled time for execution engine B in program 502, either by discarding the instruction or by setting a constraint at constraint solver 514 to prevent it from generating the read P instruction in generation step 4. This is because execution engine B does not have the most up-to-date timestamps for write instruction, which is 1, while the logical timestamp of write instruction of engine logical timestamp vector 634 of execution engine B is 0. As the read P instruction can be executed by execution engine B in parallel with, prior to, or after the execution of the write P instruction by execution engine A, the data read from address P by execution engine B can become non-deterministic. Therefore state determination module 506 can reject the write P instruction, and program generation module 504 can regenerate a different instruction/program.

In generation step 5, execution engine B can be selected to execute a WAIT-AND-CLEAR X instruction to clear event X. Execution engine B can be scheduled to execute the WAIT-AND-CLEAR X instruction at any time after the execution of SET X instruction by execution engine A. State determination module 506 can approve execution engine B to execute the WAIT-AND-CLEAR X instruction because event X is in a set state and is available to be cleared. As a result of the WAIT-AND-CLEAR instruction, state determination module 506 combines engine logical timestamp vector 634 (of execution engine B) in generation step 5 with event logical timestamp vector 642 by finding a maximum for each logical timestamp between the logical timestamp vectors based on Equation 4 above to obtain intermediate engine logical timestamp vector 634 as {0,0,1.00}. State determination module 506 can then increment the timestamp of event X in intermediate engine logical timestamp vector 634, and engine logical timestamp vector 634 can become {1,0,1.00}. The state of event X also returns back to the clear state.

In generation step 6, execution engine B can be selected to execute a read P instruction after the WAIT-AND-CLEAR X instruction. Execution engine B can be scheduled to execute the read P instruction in parallel with, before, or after execution engine A (but after the execution of the write P instruction at execution A). State determination module 506 allows execution engine B to execute the read P instruction engine B has the most up-to-date timestamp of the write instruction to address P, which is 1, which execution engine B receives from the WAIT-AND-CLEAR X instruction. As explained above, as a consumer of the event X, execution engine B is guaranteed to have access to the update made to address P by the producer of event X, execution engine A, prior to setting of event X. The data read from address P by execution engine B can become deterministic as a result. On the other hand, state determination module 506 allows multiple read instructions to the same address P to be executed in parallel by execution engines A and B as the read instructions do not change the state of address P.

In generation step 7, execution engine B can be selected to execute another write P instruction. However, state determination module 506 can reject the selection and prevent the insertion of the write P instruction into the scheduled time for execution engine B in test instruction program 502, either by discarding the instruction or by setting a constraint at constraint solver 514 to prevent it from generating the write P instruction in generation step 7. This is because execution engine B does not have the most up-to-date timestamps for write instruction, as well as for read instructions of each execution engine. State determination module 506 can determine a maximum of the write instruction timestamp among the logical timestamp vectors of execution engines A and B, which is 1. Moreover, a maximum of the read instruction timestamps of the execution engines (T4T5) among the logical timestamp vectors of execution engines A and B is max(10, 01), which becomes (11), whereas the timestamps of read instructions of engine timestamp vector 634 of execution engine B in generation step 6 is (01), which indicates that execution engine B does not have the most up-to-date timestamp of read instruction executed by execution engine A (generated in generation step 2). As the write P instruction can be executed by execution engine B in parallel with, prior to, or after the execution of the read P instruction by execution engine A, the data read from address P by execution engine A can become non-deterministic. Therefore state determination module 506 can reject the write P instruction, and program generation module 504 can regenerate a different instruction/program.

In generation step 8, execution engine B can be selected to execute a WAIT-AND-CLEAR Y instruction to clear event Y. Execution engine B can be scheduled to execute the WAIT-AND-CLEAR Y instruction at any time after the execution of SET Y instruction by execution engine A. State determination module 506 can approve execution engine B to execute the WAIT-AND-CLEAR Y instruction because event Y is in a set state and is available to be cleared. As a result of the WAIT-AND-CLEAR instruction, state determination module 506 combines engine logical timestamp vector 634 (of execution engine B) in generation step 6, which reflects the latest read instruction executed by execution engine B, with event logical timestamp vector 644 (of event Y) by finding a maximum for each logical timestamp between the logical timestamp vectors based on Equation 4 above to obtain intermediate engine logical timestamp vector 634 as {1,0,1.11}. State determination module 506 can then increment the timestamp of event Y in intermediate engine logical timestamp vector 634, and engine logical timestamp vector 634 can become {1,1,1.11}. The state of event Y also returns back to the clear state.

In generation step 9, execution engine B is selected to execute another write P instruction again. Different from generation step 7, in generation step 9 state determination module 506 allows execution engine B to execute the write P instruction because now execution engine B has the most up-to-date timestamps for the read instructions of both execution engines A and B, which execution engine B receives as a consumer of event Y. State determination module 506 can increment the logical timestamp of the write instruction of engine logical timestamp vector 634 to 2, while resetting the logical timestamps of the read instructions of execution engines A and B to 0.

The rules concerning write and read instructions to a memory can also be extended to WAIT-AND-CLEAR and WAIT instructions for an event. As described above, a WAIT-AND-CLEAR instruction seeks to wait for an event to be set, and then clear the event, while a WAIT instruction only seeks to read the status of an event. State determination module 506 can maintain a logical timestamp vector including a logical timestamp for a WAIT instruction for each event, and a logical timestamp for a WAIT-AND-CLEAR instruction for each event and for each execution engine. Similar to a write instruction to an address of a memory, state determination module 506 can determine that an execution engine can execute a WAIT-AND-CLEAR instruction if the engine logical timestamp vector has the most up-to-date timestamps for WAIT-AND-CLEAR instructions and WAIT instructions, to serialize the clear operations to the event and to ensure that a WAIT-AND-CLEAR instruction is executed only after the latest WAIT instruction. Moreover, similar to a read instruction to memory, an execution engine can execute a WAIT instruction if it has the most up-to-date timestamp for WAIT-AND-CLEAR instructions to ensure that the execution engine accesses the most up-to-date event. But state determination module 506 also allows WAIT instructions to be executed in parallel by different execution engines as the WAIT instructions do not change the state of the event.

Figure 7:
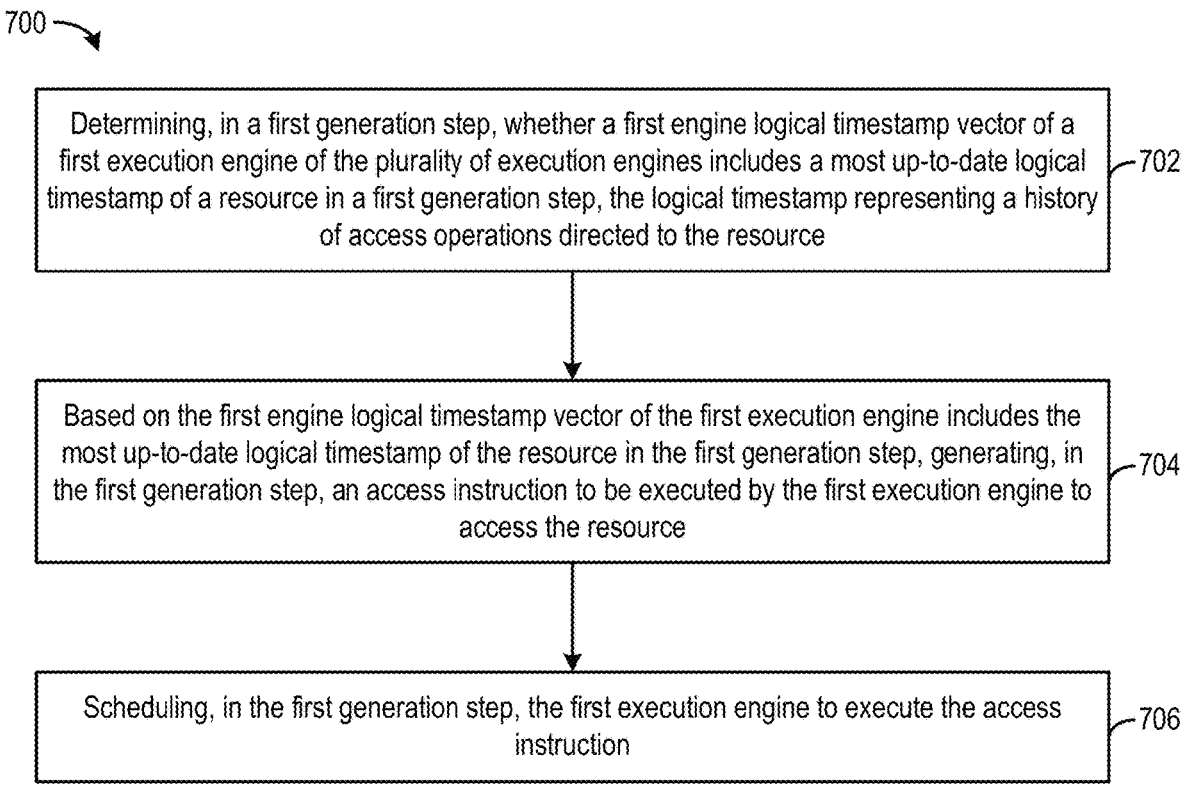
FIG. 7 illustrates an example method of generating randomized instructions for testing a distributed system, according to certain aspects of the present disclosure.

FIG. 7 illustrates a method 700 of generating test instructions for a distributed system. Method 700 can be performed by, for example, test generator 500 of FIG. 5A.

Method 700 starts with step 702, in which test generator 500 determines, in a first generation step, whether a first engine logical timestamp vector of a first execution engine of the plurality of execution engines includes a most up-to-date logical timestamp of a resource in a first generation step, the logical timestamp representing a history of access operations directed to the resource.

In some examples, the plurality of execution engines can be part of a neural network processor such as processing engine array 410, activation engine 416, and pooling engine 418. The resource can be a shared resource accessible by each of the plurality of execution engines, such as an address in memory subsystem 404, an event in event registers 440, etc. A memory address can be associated with a first logical timestamp for a read operation and a second logical timestamp for write operation, whereas an event can be associated with a third logical timestamp for a WAIT-AND-CLEAR instruction to clear the event. State determination module 506 can maintain an engine logical timestamp vector including the first logical timestamp, the second logical timestamp, and a plurality of third logical timestamps for each execution engine. The first logical timestamp of an event can be incremented when the execution engine executes a WAIT-AND-CLEAR instruction to clear the event. The second logical timestamp of an address for an execution engine can be incremented when the execution engine performs a write operation to the address. Each of the plurality of third logical timestamps can correspond to each of the plurality of execution engines, and each third logical timestamp can be incremented whenever a corresponding execution engine performs a read operation to the address. An execution engine has a most up-to-date logical timestamp of a resource if the logical timestamp(s) of that resource in the engine logical timestamp vector of the execution engine is the maximum among all of the execution engines.

In step 704, test generator 500 generates, in the first generation step, an access instruction to be executed by the first execution engine to access the resource, based on the first engine logical timestamp vector of the first execution engine including the most up-to-date logical timestamp of the resource in the first generation step. The most up-to-date logical timestamp of the resource can be defined based on one or more rules. For example, in a case where the access instruction is a SET instruction to set an event, the SET instruction can be generated based on, in the first generation step, the first execution engine having the most up-to-date first logical timestamp of the event. In a case where the access instruction is a write instruction to an address, the write instruction can be generated based on, in the first generation step, the first execution engine having the most up-to-date second logical timestamp of write operations to the address and the most up-to-date third logical timestamps of read operations to the address. Further, in a case where the access instruction is a read instruction to an address, the read instruction can be generated based on, in the first generation step, the first execution engine having the most up-to-date second logical timestamp of write operations to the address. The first execution engine is not required to have the most up-to-date third logical timestamps to allow parallel read operations to the memory address, which do not affect the states of the memory and of the distributed system.

There are various ways by which test generator 500 can generate the access instruction. In some examples, test generator 500 can employ a random function to select a candidate instruction from a database of instructions, and to determine a parameter for the candidate instruction and to assign the candidate instruction to the first execution engine. If the candidate instruction is an instruction that accesses a shared resource (e.g., a SET event instruction, a read instruction to read from a memory address, a write instruction to read from a memory address, etc.), the test generator can check the logical timestamps for the shared resource (event, memory address, etc.) of the first execution engine based on the aforementioned rules to whether the logical timestamps are the most up-to-date, as explained above. If the logical timestamps of the first execution engine are not the most up-to-date, test generator 500 can discard the access instruction and regenerate another one.

In some examples, test generator 500 can also employ a constraint solver to generate the access instruction according to a pre-determined test pattern. The constraint solve may set constraints on the generation of the access instruction based on the aforementioned rules. For example, instead of generating instructions that are completely independent from each other, test generator 500 can employ a Markov chain model to generate the access instruction that not only satisfies a pre-determined relationship with prior-generated (and approved) instructions but also satisfies the aforementioned rules. As an illustrative example, the test generator may determine, based on a prior instruction of the first execution engine being a SET instruction, to assign a WAIT-AND-CLEAR instruction as a new test instruction to the first execution engine. Test generator 500 may also select, based on a test pattern (e.g., to traverse all available events), an event to be set by the SET instruction. The selection of which event to be set by the SET instruction can be constrained, by the constraint solver, based on the aforementioned rules. For example, the constraint solver can ensure that the selected event is either an event that has not been cleared by a prior WAIT-AND-CLEAR instruction, or if the event has been cleared by a prior WAIT-AND-CLEAR instruction, the first execution engine must have the most up-to-date third logical timestamp of that event.

In step 706, test generator 500 can schedule, in the first generation step, the first execution engine to execute the access instruction. Test generator 500 can schedule the first execution engine to execute the access instruction right after the execution of a prior instruction, but can schedule the access instruction to be executed after other instructions at other execution engines if the access instruction has data dependency on those instructions. For example, in a case where the access instruction is a WAIT-AND-CLEAR instruction, the WAIT-AND-CLEAR instruction to clear an event X can be scheduled to be executed after a SET X instruction is executed in another execution engine, whereas a write instruction to a first address can be executed in parallel with a write instruction to a second address.

Figure 8:
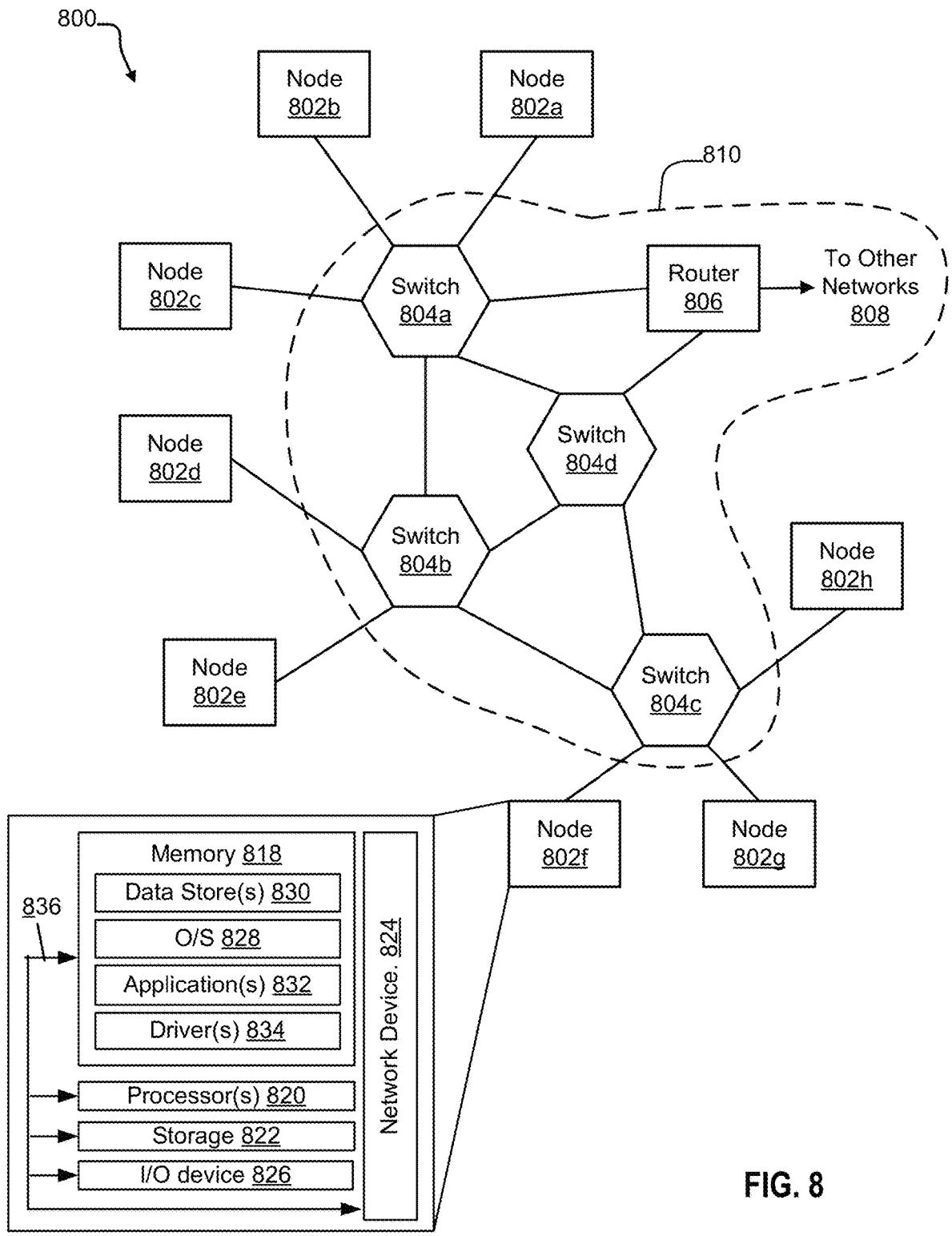
FIG. 8 includes a diagram of an example network.

FIG. 8 includes a diagram of an example network 800, which can include one or more host systems, such as the host system. For example, the example network 800 of FIG. 8 includes multiple nodes 802a-802h, one or more of which can be a host system. Others of the nodes 802a-802h can be other computing devices, each of which include at least a memory for storing program instructions, a processor for executing the instructions, and a network interface for connecting to the network 800.

In various examples, the network 800 can be used to process data. For example, input data can be received at one of the nodes 802a-802h or from other networks 808 with which the network 800 can communicate. In this example, the input data can be directed to a node in the network 800 that includes an acceleration engine, for the acceleration engine to operate on and produce a result. The result can then be transferred to the node or other network from which the input data was received. In various examples, input data can be accumulated from various sources, including one or more of the nodes 802a-802h and/or computing devices located in the other networks 808, and the accumulated input data can be directed to one or more host systems in the network 800. Results from the host systems can then be distributed back to the sources from which the input data was gathered.

In various examples, one or more of the nodes 802a-802h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 8, the nodes 802a-802h are connected to one another using a switched architecture with point-to point links. The switched architecture includes multiple switches 804a-804d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 804a-804d of FIG. 8 may be connected to the nodes 802a-802h and provide multiple paths between any two nodes.

The network 800 may also include one or more network devices for connection with other networks 808, such as a router 806. Routers use headers and forwarding tables to determine the best path for forwarding the packets, and use protocols such as internet control message protocol (ICMP) to communicate with each other and configure the best route between any two devices. The router 806 of FIG. 8 can be used to connect to other networks 808 such as subnets, LANs, wide area networks (WANs), and/or the Internet.

In some examples, network 800 may include any one or a combination of many different types of networks, such as cable networks, the Internet, wireless networks, cellular networks and other private and/or public networks. The interconnected switches 804a-804d and the router 806, if present, may be referred to as a switch fabric 810, a fabric, a network fabric, or simply a network. In the context of a computer network, terms "fabric" and "network" may be used interchangeably herein.

The nodes 802a-802h may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802a-802h, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802a-802h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802a-802h or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate. The communication channel or channels 836 may take the form of a bus, a ring, a switching fabric, or a network.

The node(s) 802a-802h may also contain network device(s) 824 that allow the node(s) 802a-802h to communicate with a stored database, another computing device or server, user terminals and/or other devices on the network(s) 800.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method of generating test instructions to be executed by execution engines that share a resource of an integrated circuit, the method comprising:
   in a first generation step:
      reading a first engine logical timestamp vector of a first execution engine of the execution engines, the first engine logical timestamp vector representing a history of access operations of the resource maintained for the first execution engine;
      determining whether the first engine logical timestamp vector includes a most-up-to-date engine logical timestamp of the resource among engine logical timestamps maintained for all the execution engines in the first generation step;
      based on the first engine logical timestamp vector including the most-up-to-date logical timestamp of the resource in the first generation step, generating an access instruction to be executed by the first execution engine to access the resource; and
      scheduling the first execution engine to execute the access instruction.

2. The method of claim 1, further comprising:
in a second generation step, scheduling a second execution engine to access the resource;
incrementing the logical timestamp of the resource in a second engine logical timestamp vector of the second execution engine to reflect the access of the resource by the second execution engine;
in a third generation step, scheduling the second execution engine to execute a first SET instruction to set an event, wherein the setting of the event copies the second engine logical timestamp vector to an event logical timestamp vector of the event; and
in a fourth generation step, scheduling the first execution engine to execute a WAIT-AND-CLEAR instruction to clear the event, wherein the clearing of the event causes the first engine logical timestamp vector of the first execution engine to combine with the event logical timestamp vector to include a combined history of access operations for the resource.

3. The method of claim 2, wherein the resource includes the event and a memory; and
wherein the first engine logical timestamp vector includes:
a first logical timestamp of the WAIT-AND-CLEAR instruction that clears the event,
a second logical timestamp of a write instruction to the memory, and
a plurality of third logical timestamps of a read instruction by each execution engine of the execution engines.

4. The method of claim 3, wherein a second SET instruction is generated in the first generation step; and
wherein the first execution engine is scheduled to execute the second SET instruction based on the first engine logical timestamp vector having, in the first generation step, the most-up-to-date first logical timestamp of the WAIT-AND-CLEAR instruction among engine logical timestamp vectors of the execution engines.

5. The method of claim 3, wherein the write instruction is generated in the first generation step; and
wherein the first execution engine is scheduled to execute the write instruction based on the first engine logical timestamp vector having, in the first generation step, a most-up-to-date second logical timestamp of the write instruction and a most up-to-date plurality of third logical timestamps of the read instruction among the engine logical timestamp vectors of the execution engines.

6. The method of claim 3, wherein the read instruction is generated in the first generation step; and
wherein the first execution engine is scheduled to execute the read instruction based on the first engine logical timestamp vector having, in the first generation step, a most-up-to-date second logical timestamp of the write instruction.

7. A non-transitory computer readable medium storing instructions that, when executed by one or more hardware processors, cause the one or more hardware processors to at least:
generate, based on a function, a first instruction;
assign, based on the function, the first instruction to a first execution engine of a plurality of execution engines of a distributed system that share a resource; and
schedule the first execution engine to execute the first instruction based on a determination that the execution of the first instruction by the first execution engine does not lead to a non-deterministic state in the distributed system or the resource due to the first instruction being not synchronized with other instructions scheduled at other execution engines of the plurality of execution engines, wherein the determination is made using a first engine logical timestamp vector representing a history of access operations of the resource maintained for the first execution engine.

8. The non-transitory computer readable medium of claim 7, wherein the resource comprises a memory, an event to synchronize access operations of the memory between two execution engines of the plurality of execution engines, or both the memory and the event.

9. The non-transitory computer readable medium of claim 8, wherein the determination that the execution of the first instruction by the first execution engine at a first time does not lead to the non-deterministic state in the resource is based on determining that the updating or retrieving of the resource by the first instruction follows a deterministic order with respect to the updating or retrieving of the resource by the other instructions.

10. The non-transitory computer readable medium of claim 8, further comprising instructions that cause the one or more hardware processors to:
generate, in each generation step of a plurality of generation steps, an instruction for one execution engine of the execution engines, wherein the first instruction is generated in a first generation step of the plurality of generation steps;
determine, in the each generation step, one or more logical timestamps of the resource for each of the plurality of execution engines, the logical timestamp reflecting an access history of the resource up to the each generation step; and
determine that the execution of the first instruction by the first execution engine does not lead to a non-deterministic state in the distributed system or the resource based on the one or more logical timestamps for the first execution engine being a most-up-to-date among the one or more logical timestamps for the plurality of execution engines in the first generation step.

11. The non-transitory computer readable medium of claim 10, wherein the non-transitory computer readable medium further comprises instructions that cause the one or more hardware processor to:
in a second generation step of the plurality of generation steps, increment the one or more logical timestamps for a second execution engine of the plurality of execution engines based on the second execution engine being scheduled to execute a second instruction to access the resource in the second generation step; and
in a third generation step of the plurality of generation steps, combine the incremented one or more logical timestamps for the second execution engine with the one or more logical timestamps for the first execution engine based on the first execution engine being scheduled to execute a WAIT-AND-CLEAR instruction to clear the event in the third generation step.

12. The non-transitory computer readable medium of claim 10, wherein:
the resource comprises the event;
the one or more logical timestamps comprise a first logical timestamp of the event, wherein the first logical timestamp vector includes the first logical timestamp;

the first generation step is after the second and third generation steps;

the first instruction is a second SET instruction; and the non-transitory computer readable medium further comprises instructions that cause the one or more hardware processors to schedule the second SET instruction based on the first logical timestamp for the first execution engine being the maximum among the first logical timestamps for the plurality of execution engines.

13. The non-transitory computer readable medium of claim 12, wherein the first logical timestamp for the first execution engine is associated with the most up-to-date WAIT-AND-CLEAR instruction to clear the event at the first execution engine or at other execution engine of the plurality of execution engines in the first generation step.

14. The non-transitory computer readable medium of claim 10, wherein the resource comprises the memory;
wherein the one or more logical timestamps comprise:
a first logical timestamp of write operations to the memory, and
a plurality of second logical timestamps of read operations to the memory by each of the plurality of execution engines.

15. The non-transitory computer readable medium of claim 14,
wherein the first instruction is a second write operation; and
wherein the non-transitory computer readable medium further comprises instructions that cause the one or more hardware processors to:
determine that the updating of the memory by the second write operation follows the deterministic order with respect to the updating of the memory by other write operations and the reading of the memory by other read operations, the determination being based on the first logical timestamp and the plurality of second logical timestamps for the first execution engine being the maximum among, respectively, the first logical timestamps and the plurality of second logical timestamps for the plurality of execution engines.

16. The non-transitory computer readable medium of claim 14,
wherein the first instruction is a second read operation; and
wherein the non-transitory computer readable medium further comprises instructions that cause the one or more hardware processors to:
determine that the reading of the memory by the second read operation follows the deterministic order with respect to the updating of the memory by other write operations based on the first logical timestamp for the first execution engine being the maximum among the first logical timestamps for the plurality of execution engines.

17. The non-transitory computer readable medium of claim 14, wherein the function comprises a random function, a constraint solver, or both a random function and a constraint solver.

18. The non-transitory computer readable medium of claim 7, further comprising instructions that cause the one or more hardware processors to:
generate a program including the scheduling of the first execution engine to execute the first instruction; and
provide the program to an electronic design automation (EDA) application to perform simulations on a behavioral model of the distributed system.

19. An apparatus, comprising:
a memory that stores a set of instructions; and
a hardware processor configured to execute the set of instructions to:
generate, based on a function, a first instruction;
assign, based on the function, the first instruction to a first execution engine of a plurality of execution engines of a distributed system that share a resource; and
schedule the first execution engine to execute the first instruction based on a determination that the execution of the first instruction by the first execution engine does not lead to a non-deterministic state in the distributed system or the resource due to the first instruction being not synchronized with other instructions scheduled at other execution engines of the plurality of execution engines, wherein the determination is made using a first engine logical timestamp vector representing a history of access operations of the resource maintained for the first execution engine.

20. The apparatus of claim 19, wherein the resource comprises a memory, an event to synchronize access operations of the memory between two execution engines of the plurality of execution engines, or both the memory and the event; and
wherein the scheduling of the first execution engine to execute the first instruction is based on:
the first instruction being a SET instruction to set an event and the first execution engine having a most-up-to-date logical timestamp of the event;
the first instruction being a write instruction to perform a write operation to an address and the first execution engine having a most-up-to-date logical timestamp of write operations to the address and most-up-to-date logical timestamps of read operations to the address; or
the first instruction being a read instruction to perform a read operation to the address and the first execution engine having the most-up-to-date logical timestamps of read operations to the address.

* * * * *